US011104821B2

United States Patent
Otomo et al.

(10) Patent No.: US 11,104,821 B2
(45) Date of Patent: *Aug. 31, 2021

(54) RECEPTIVE SOLUTION, INK SET CONTAINING SAID RECEPTIVE SOLUTION AND METHOD FOR PRODUCING PRINTED MATERIAL USING INK SET

(71) Applicant: DNP Fine Chemicals Co., Ltd., Yokohama (JP)

(72) Inventors: Kentaro Otomo, Yokohama (JP); Fumie Yamazaki, Yokohama (JP); Naoki Shiraishi, Yokohama (JP); Kisei Matsumoto, Yokohama (JP); Yoshiya Maegawa, Yokohama (JP)

(73) Assignee: DNP Fine Chemicals Co., Ltd., Yokohama (JP)

( * ) Notice: Subject to any disclaimer, the term of this patent is extended or adjusted under 35 U.S.C. 154(b) by 119 days.

This patent is subject to a terminal disclaimer.

(21) Appl. No.: 16/495,852

(22) PCT Filed: Mar. 28, 2018

(86) PCT No.: PCT/JP2018/012878
§ 371 (c)(1),
(2) Date: Sep. 20, 2019

(87) PCT Pub. No.: WO2018/181528
PCT Pub. Date: Oct. 4, 2018

(65) Prior Publication Data
US 2020/0040207 A1 Feb. 6, 2020

(30) Foreign Application Priority Data

Mar. 31, 2017 (JP) .............................. JP2017-073234

(51) Int. Cl.
*C09D 11/54* (2014.01)
*B41M 5/00* (2006.01)
*C09D 11/023* (2014.01)
*C09D 11/10* (2014.01)
*C09D 11/322* (2014.01)
(Continued)

(52) U.S. Cl.
CPC ............ *C09D 11/54* (2013.01); *B41J 2/2107* (2013.01); *B41J 2/2114* (2013.01); *B41M 5/0017* (2013.01); *B41M 5/0023* (2013.01); *C09D 11/023* (2013.01); *C09D 11/10* (2013.01);
(Continued)

(58) Field of Classification Search
CPC ....... C09D 11/54; C09D 11/023; C09D 11/10; C09D 11/322; C09D 11/38; C09D 11/40; C09D 11/36; C09D 11/30; C09D 11/32; C09D 11/324; C09D 11/328; C09D 11/101; C09D 11/102; C09D 11/005; C09D 11/52; C09D 11/106; B41J 2/2107; B41J 2/2114; B41J 2/01; B41J 2/211; B41J 2/1433; B41J 2/17; B41J 2/17593; B41J 2/1755; B41J 2/2117; B41J 2/2056; B41J 2/21; B41J 2/0057; B41J 3/60; B41J 2002/012; B41J 2/04586; B41J 2/04598; B41J 2/04588; B41J 2/04595; B41J 2/14274; B41J 2/1623; B41J 2202/00; B41J 2202/03; B41J 2/045; B41J 11/0015; B41J 11/002; B41J 2/04581; B41J 2/055; B41J 2/14201; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/16538; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS 6,506,239 B1   1/2003 Osumi et al.
6,703,112 B1   3/2004 Farooq et al.
(Continued)

FOREIGN PATENT DOCUMENTS

CN   101590726 A   12/2009
EP   0534634 A1   3/1993
(Continued)

OTHER PUBLICATIONS

Notice of Reasons for Rejection dated Jan. 9, 2018, issued to JP Application No. 2017-073234.
(Continued)

*Primary Examiner* — Manish S Shah
(74) *Attorney, Agent, or Firm* — Locke Lord LLP

(57) ABSTRACT

The purpose of the present invention is to provide a receptive solution which can suppress the occurrence of odor from the receptive solution itself when the receptive solution is applied on a recording medium, and can also prevent the appearance of a printed surface from being deteriorated. The receptive solution for ink-jet recording ink contains polyvalent metal cations, an aqueous solvent, a resin, and anions, wherein the resin is contained as a resin emulsion, and the anions contained in the receptive solution contain anions of an organic substance which has an OV/IV value of 0.3-1.0, the OV/IV value being a ratio of an organic value to an inorganic value.

20 Claims, No Drawings

(51) Int. Cl.
*C09D 11/38* (2014.01)
*C09D 11/40* (2014.01)
*B41J 2/21* (2006.01)

(52) U.S. Cl.
CPC ............ *C09D 11/322* (2013.01); *C09D 11/38* (2013.01); *C09D 11/40* (2013.01)

(56) References Cited

U.S. PATENT DOCUMENTS

| | | | |
|---|---|---|---|
| 2003/0008115 A1 | 1/2003 | Sugiyama et al. | |
| 2005/0208441 A1* | 9/2005 | Oyamada | G03C 1/49872 430/619 |
| 2006/0274113 A1* | 12/2006 | Ono | B41J 2/16535 347/42 |
| 2009/0295893 A1 | 12/2009 | Akiyama et al. | |
| 2011/0200751 A1* | 8/2011 | Yatake | C09D 11/322 427/261 |
| 2011/0269885 A1 | 11/2011 | Imai | |
| 2012/0268521 A1* | 10/2012 | Moribe | B41J 2/2107 347/21 |
| 2013/0141500 A1 | 6/2013 | Prasad et al. | |
| 2014/0253631 A1* | 9/2014 | Namba | B41J 2/01 347/21 |
| 2015/0091973 A1* | 4/2015 | Ikoshi | B41J 2/01 347/21 |
| 2015/0091974 A1* | 4/2015 | Aoyama | B41J 2/2114 347/21 |
| 2015/0239261 A1* | 8/2015 | Sugiyama | C08K 5/098 347/21 |
| 2015/0290928 A1 | 10/2015 | Noguchi et al. | |
| 2016/0214401 A1* | 7/2016 | Komatsu | B41J 2/2114 |
| 2016/0339719 A1* | 11/2016 | Yano | B41J 11/0015 |
| 2017/0233595 A1 | 8/2017 | Erdodi et al. | |
| 2017/0247561 A1* | 8/2017 | Nakagawa | B41J 11/0015 |
| 2017/0292035 A1* | 10/2017 | Saito | C09D 11/322 |

FOREIGN PATENT DOCUMENTS

| | | |
|---|---|---|
| EP | 1022151 A1 | 7/2000 |
| EP | 2233309 A2 | 9/2010 |
| EP | 2522701 A1 | 11/2012 |
| JP | S63-299970 A | 12/1988 |
| JP | H05-202328 A | 8/1993 |
| JP | 2000-301830 A | 10/2000 |
| JP | 2001-162920 A | 6/2001 |
| JP | 2002-518215 A | 6/2002 |
| JP | 2003-072233 A | 3/2003 |
| JP | 2008-265060 A | 11/2008 |
| JP | 2009-137052 A | 6/2009 |
| JP | 2009-137054 A | 6/2009 |
| JP | 2009-286117 A | 12/2009 |
| JP | 2010-105364 A | 5/2010 |
| JP | 2011-245850 A | 12/2011 |
| JP | 2012-111845 A | 6/2012 |
| JP | 2013-151087 A | 8/2013 |
| JP | 2015-161043 A | 9/2015 |
| JP | 2015-202616 A | 11/2015 |
| JP | 2016-215619 A | 12/2016 |
| JP | 2017-013349 A | 1/2017 |
| JP | 2017-013350 A | 1/2017 |
| JP | 2017-024397 A | 2/2017 |
| JP | 2017-088646 A | 5/2017 |
| TW | 201610001 A | 3/2016 |
| WO | 99/065703 A1 | 12/1999 |
| WO | 2015/041702 A1 | 3/2015 |

OTHER PUBLICATIONS

International Search Report dated May 15, 2018, issued for PCT/JP2018/012878.
Atsushi Fujita, "Prediction of Organic Compounds by a Conceptional Diagram", Pharmaceutical Bulletin, Jan. 1, 1954, pp. 163-173. (cited in the Feb. 24, 2020 Search Report issued for EP18774738.1).
Extended European Search Report dated Feb. 24, 2020, issued in the EP Patent Application No. 18774738.1.
Extended European Search Report issued in the EP Patent Application No. EP18775358.7, dated Feb. 24, 2020.
International Search Report including Written Opinion issued in the International Application No. PCT/JP2018/012877 dated May 15, 2018.

* cited by examiner

RECEPTIVE SOLUTION, INK SET CONTAINING SAID RECEPTIVE SOLUTION AND METHOD FOR PRODUCING PRINTED MATERIAL USING INK SET

TECHNICAL FIELD

The present invention relates to a receptive solution for ink-jet recording ink that is mainly an aggregation type, an ink set containing the receptive solution, and a method for producing a printed material using the ink set.

BACKGROUND ART

The ink-jet recording method is a recording method which directly ejects and applies ink droplets from very fine nozzles to a recording medium such as paper, thereby obtaining letters and/or images. For this recording method, miniaturization, speed increase, noise reduction, power saving, and colorization are easy, and even more, non-contact printing to the recording medium is possible, and therefore, the application range is not only household use, but is expanding to office use and commercial printing use.

As an ink composition used in ink-jet recording method, an aqueous dye ink composition in which various water-soluble dyes are dissolved in water, or in a liquid mixture of water and water-soluble organic solvent, is widely used. However, when an aqueous dye ink composition is applied to a recording medium such as paper that is used widely in general, such as plain paper and recycled paper, the ink composition is absorbed into the paper fibers, and, simultaneously, spreads around the landing position so that blurring that is called feathering may occur.

As such, by focusing on the fact that the dye is anionic, it has been proposed that, before ejecting the aqueous dye ink composition on a recording medium, a receptive solution containing polyvalent metal salts is applied on the recording medium, and then the aqueous dye ink composition is ejected onto the receptive solution for ink-jet recording (for example, see, Patent Documents 1 to 4). By ejecting the aqueous dye ink composition onto a receptive solution, the image quality can be improved when printing is made.

In this case, the storage stability of a receptive solution may become an issue, similar to the storage stability of an ink composition. For example, as the polyvalent metal salts that had been contained in the receptive solution precipitate out, nozzle clogging in the ink-jet head or blockage of the flow path of the reaction liquid may occur in the ink-jet recording device. In addition, as the receptive solution for ink-jet recording deteriorates along with the passage of time, there has been a demand for increasing the storage stability so as to suppress the deterioration of the receptive solution.

As such, a receptive solution in which composition of the polyvalent metal salts to be contained in the receptive solution is specified and also a resin emulsion is contained has been proposed (see, Patent Document 5). The receptive solution of Patent Document 5 is a receptive solution which enables the improvement of storage stability and also the enhancement of image quality of a printed matter.

Patent Document 1: Japanese Unexamined Patent Application, Publication No. S63-299970
Patent Document 2: Japanese Unexamined Patent Application, Publication No. H5-202328
Patent Document 3: Japanese Unexamined Patent Application, Publication No. 2001-162920
Patent Document 4: Japanese Unexamined Patent Application, Publication No. 2012-111845
Patent Document 5: Japanese Unexamined Patent Application, Publication No. 2017-24397

DISCLOSURE OF THE INVENTION

Problems to be Solved by the Invention

Before the reaction and/or after the reaction of a polymerization reaction of a monomer as a raw material of a resin, the resin emulsion contained in a receptive solution is generally neutralized by addition of an acid or a base for the purpose of enhancing the dispersion property of a resin emulsion. Due to this reason, in the resin emulsion, anions originating from an acid, which is used during the process of producing a resin emulsion, may be contained.

Meanwhile, other than the resin emulsion, anions originating from the polyvalent metal salts or the like are contained in the receptive solution. Due to this reason, when an acid is used during the process of producing a resin emulsion, the anions originating from an acid used during the process of producing a resin emulsion and the anions originating from polyvalent metal salts or the like are co-present in the receptive solution.

However, according to the idea of the inventors of the present invention, the followings are found. Depending on the composition and structure of the anions originating from an acid used during the process of producing a resin emulsion and the anions originating from polyvalent metal salts or the like, the appearance of printed surface is deteriorated, for example, the color exhibition and/or gloss on a printed surface having the ink composition ejected on a receptive solution (hereinbelow, printed surface having the ink composition ejected on a receptive solution is simply described as a "printed surface") are/is partially deteriorated. In addition, there is also a case in which odor is occurred from the receptive solution itself when the receptive solution is applied on a recording medium.

The present invention is achieved in consideration of the above circumstances, and an object thereof is to provide a receptive solution which can suppress the occurrence of odor from the receptive solution itself when the receptive solution is applied on a recording medium, and can also prevent the appearance of a printed surface from being deteriorated.

Means for Solving the Problems

To solve the aforementioned problems, the inventors of the present invention have conducted intensive studies, and, as a result, have found that the problems can be solved if the receptive solution which is contained as a resin emulsion containing anions is a receptive solution in which the anions contained in the receptive solution contain anions of an organic substance with a controlled OV/IV value, in which the OV/IV value is a ratio of an organic value to an inorganic value, thereby completing the present invention.

(1) A receptive solution for ink-jet recording ink, containing polyvalent metal cations, a water-soluble solvent, a resin, and anions, in which the resin is contained as a resin emulsion, and the anions contained in the receptive solution contain anions of an organic substance which have an OV/IV value of 0.3 or more and 1.0 or less, the OV/IV value being a ratio of an organic value to an inorganic value.

(2) The receptive solution described in (1), in which the anions of an organic substance are anions of an aromatic organic substance.

(3) The receptive solution described in (1) or (2), in which the resin emulsion contains the anions of an organic substance.

(4) The receptive solution described in any one of (1) to (3), in which the resin emulsion is a cationic resin emulsion.

(5) The receptive solution described in any one of (1) to (4), in which the receptive solution is ejected by an ink-jet method.

(6) The receptive solution described in any one of (1) to (5), in which an anion of benzoic acid and/or an anion of salicylic acid are/is contained in the anions that are contained in the receptive solution.

(7) An ink set including the receptive solution described in any one of (1) to (6) and an ink composition containing a color material.

(8) A method for producing a receptive solution, including: a step for producing a resin emulsion in which a resin emulsion is produced at least from a surfactant, a resin, and an acid; and a step for producing a receptive solution in which a receptive solution containing the resin emulsion, anions, cations of polyvalent metals, and a water-soluble solvent is produced, in which the acid of the step for producing a resin emulsion contains an organic acid which has an OV/IV value of 0.3 or more and 1.0 or less, the OV/IV value being a ratio of an organic value to an inorganic value, and the anions of the step for producing a receptive solution contain anions of an organic substance which have an OV/IV value of 0.3 or more and 1.0 or less, the OV/IV value being a ratio of an organic value to an inorganic value.

(9) The method for producing a receptive solution described in (8), in which the acid of the step for producing a resin emulsion contains benzoic acid and/or salicylic acid.

(10) The method for producing a receptive solution described in (8) or (9), in which the anions of the step for producing a receptive solution contain an anion of benzoic acid and/or an anion of salicylic acid.

(11) A method for producing a printed material including a step of applying the receptive solution described in any one of (1) to (6) on a recording medium, or on an ink composition containing a color material.

Effects of the Invention

The receptive solution of the present invention is a receptive solution which can suppress the occurrence of odor from the receptive solution itself when the receptive solution is applied on a recording medium, and can also prevent the appearance of a printed surface from being deteriorated.

PREFERRED MODE FOR CARRYING OUT THE INVENTION

Hereinbelow, specific embodiments of the present invention are described in detail, but the present invention is not limited to the following embodiments at all, and, within the scope of the object of the present invention, the present invention can be carried out by adding suitable modifications.

<Receptive Solution>

The receptive solution of one embodiment of the present invention is a receptive solution containing at least polyvalent metal cations, a water-soluble solvent, a resin, and anions. The polyvalent metal cations indicate metal ions which are positive ions and also have the valency of at least 2. The anions indicate anions that can be dissolved in a water-soluble solvent.

In addition, the anions contained in the receptive solution relating to the present embodiment contain anions of an organic substance which have an OV/IV value of 0.3 or more and 1.0 or less, in which the OV/IV value is a ratio of an organic value to an inorganic value. Herein, the organic value and inorganic value of anions of an organic substance mean the organic value and inorganic value of an organic concept drawing, and, for an organic compound, the two factors, i.e., the "organic" originating from the covalent bond linkage in carbon region of the compound and "inorganic" resulting from an influence of the electrostaticity present in a substituent group (functional group), are converted into a numeric value based on the descriptions given in "Qualitative Organic Analysis" (1970, written by Atsushi Fujita), and the organic value is plotted on an X axis and the inorganic value is plotted on a Y axis of a drawing. Furthermore, in the present specification, the "organic value·inorganic value of anions of an organic substance" means not an organic value·inorganic value of anions themselves (for example, caprylic acid ion: $C_8H_{15}COO^-$) but an organic value·inorganic value of an organic substance in which a hydrogen ion ($H^+$) is given to the anions of an organic substance (for example, caprylic acid: $C_8H_{15}COOH$), for the sake of simple calculation.

The OV/IV value is a value which corresponds to a ratio of an organic value of a compound to an inorganic value of anions, and it is an indicator which represents the non-polarity degree of the anions. Herein, in the receptive solution of the present embodiment, the "anions contained in the receptive solution" has a concept including both (1) anions originating from an acid used for the process of producing a resin emulsion (hereinbelow, the anions may be also referred to as "anions originating from the resin emulsion"), and (2) anions originating from the polyvalent metal salts or the like that are contained in the receptive solution (hereinbelow, the anions may be also referred to as "anions originating from the polyvalent metal salts or the like"). Furthermore, in the present specification, the "anions contained in the receptive solution" means, unless specifically described otherwise, anions contained in the receptive solution without asking their origin from a certain component.

Furthermore, the anions originating from the polyvalent metal salts or the like has a concept including both the anions (for example, caprylic acid ion) obtained by adding polyvalent metal salts (for example, magnesium caprylate) and anions (for example, caprylic acid ion) obtained by adding a compound capable of generating anions in the receptive solution (for example, caprylic acid). Furthermore, in the present specification, the "anions originating from polyvalent metal salts or the like" means, unless specifically described otherwise, anions originating from polyvalent metal salts or a compound capable of generating anions, and it does not include the "anions originating from the resin emulsion."

According to the idea of the inventors of the present invention, when the anions contained in the receptive solution, including (1) and (2) described above, contains anions of an organic substance which have an OV/IV value of 0.3 or more and 1.0 or less, a receptive solution which can prevent the appearance of a printed surface, in which the ink composition is ejected on the receptive solution, from being deteriorated can be provided. As the present embodiment, the receptive solution, in which the OV/IV value of anions of an organic substance contained in each anion is set at 0.3 or more and 1.0 or less by focusing on, instead of the OV/IV value of anions of an organic substance that are contained in the anions originating from just one component, the OV/IV value of anions of an organic substance that are contained in the anions that are contained in the receptive solution, is a novel receptive solution.

Furthermore, the anions contained in the receptive solution relating to the present embodiment may also contain anions other than the anions of an organic substance which have an OV/IV value of 0.3 or more and 1.0 or less. Examples of the anions other than the anions of an organic substance which have an OV/IV value of 0.3 or more and 1.0 or less include, although not particularly limited, anions of an organic substance such as an anion of pantothenic acid, an anion of pantoic acid, an anion of propionic acid, an anion of ascorbic acid, an anion of acetic acid, an anion of malic acid, an anion of benzoic acid, or an anion of lactic acid, and anions of an inorganic acid such as nitric acid ion, sulfuric acid ion, or chloride ion.

Furthermore, content of the anions of an organic substance which have an OV/IV value of 0.3 or more and 1.0 or less is, relative to the entire anions contained in the receptive solution, preferably 50% by mass or more, more preferably 80% by mass or more, even more preferably 90% by mass or more, and still even more preferably 95% by mass or more.

As the anions contained in the receptive solution contain anions of an organic substance which have an OV/IV value of 0.3 or more and 1.0 or less, they can prevent the appearance of a printed surface from being deteriorated. If the anions of an organic substance have an OV/IV value of less than 0.3, the appearance of a printed surface may be deteriorated, and therefore not desirable. On the other hand, if the anions of an organic substance have an OV/IV value of more than 1.0, increased crystallinity of the anions of an organic substance contained in the receptive solution is yielded so that the anions of an organic substance are not evenly present in a coating film. As a result, a lower functional property as the receptive solution is yielded to have deteriorated appearance of a printed surface, and therefore not desirable. Furthermore, the OV/IV value of the anions of an organic substance is preferably 0.5 or more. The OV/IV value of the anions of an organic substance is preferably 0.8 or less.

As a specific example of the anions of an organic substance that are contained in anions contained in the receptive solution, ions of benzoic acid (OV/IV value=0.85), salicylic acid (OV/IV value=0.53), 2,4-dihydroxybenzoic acid (OV/IV value=0.38), 2,5-dihydroxybenzoic acid (OV/IV value=0.38), glutaric acid (OV/IV value=0.33), suberic acid (OV/IV value=0.53), or trimellitic acid (OV/IV value=0.39) can be mentioned.

Furthermore, from the viewpoint of storage stability and ejection stability of the receptive solution, among the anions of an organic substance, anions of an aromatic organic substance are preferable, anions of an organic substance having a benzene ring or anions of an organic substance having a polycyclic aromatic hydrocarbon (for example, compound having naphthalene ring, anthracene ring or the like) are more preferable, and anions of an organic substance having a benzene ring (for example, benzoic acid, salicylic acid, 2,4-dihydroxybenzoic acid, and 2,5-dihydroxybenzoic acid) are even more preferable. The aromatic organic substance indicates a cyclic unsaturated organic substance such as an organic substance having a benzene ring, an organic substance of a polycyclic aromatic hydrocarbon, and an organic substance of a heteroaromatic compound. Furthermore, the number of the atoms constituting one ring among the aromatic rings constituting the anions of an aromatic organic substance is preferably 5 or higher, and a benzene ring, a 5-membered heterocycle (pyrrole ring, furan ring, and thiophene ring), and a 6-membered heterocycle (pyridine ring, pyran ring, and thiopyran ring) are preferable. Furthermore, among the anions of an organic substance having a benzene ring, from the viewpoint of preventing the deterioration of appearance on a printed surface, ions of benzoic acid or salicylic acid are particularly preferable.

Hereinbelow, each component contained in the receptive solution is specifically described.

[Anions of Organic Substance]

The receptive solution of the present embodiment contains anions containing the anions of an organic substance. As for the anions of an organic substance contained in the anions that are contained in the receptive solution, there are anions of an organic substance originating from the resin emulsion and anions of an organic substance originating from polyvalent metal salts or the like, but, herein, descriptions are given only for the anions of an organic substance originating from polyvalent metal salts or the like.

The anions of an organic substance originating from polyvalent metal salts or the like can be obtained by, for example, adding polyvalent metal salts containing anions of an organic substance and cations of polyvalent metal. Furthermore, they can be also obtained by adding a compound capable of generating anions of an organic substance in the receptive solution.

The anions of an organic substance originating from polyvalent metal salts or the like are not particularly limited as long as they have an OV/IV value of 0.3 or more and 1.0 or less, and ions of benzoic acid (OV/IV value=0.85), salicylic acid (OV/IV value=0.53), 2,4-dihydroxybenzoic acid (OV/IV value=0.38), 2,5-dihydroxybenzoic acid (OV/IV value=0.38), glutaric acid (OV/IV value=0.33), suberic acid (OV/IV value=0.53), or trimellitic acid (OV/IV value=0.39) can be mentioned.

Furthermore, from the viewpoint of storage stability and ejection stability of the receptive solution, among the anions of an organic substance originating from polyvalent metal salts or the like, anions of an aromatic organic substance are preferable, anions of an organic substance having a benzene ring (for example, benzoic acid, salicylic acid, 2,4-dihydroxybenzoic acid, and 2,5-dihydroxybenzoic acid) or anions of an organic substance having a polycyclic aromatic hydrocarbon (for example, compound having naphthalene ring, anthracene ring or the like) are more preferable, and anions of an organic substance having a benzene ring are even more preferable. The aromatic organic substance indicates a cyclic unsaturated organic substance such as an organic substance having a benzene ring, an organic substance of a polycyclic aromatic hydrocarbon, and an organic substance of a heteroaromatic compound. Furthermore, the number of the atoms constituting one ring among the aromatic rings constituting the anions of an aromatic organic substance is preferably 5 or higher, and a benzene ring, a 5-membered heterocycle (pyrrole ring, furan ring, and thiophene ring), and a 6-membered heterocycle (pyridine ring, pyran ring, and thiopyran ring) are preferable. Furthermore, among the anions of an organic substance having a benzene ring, from the viewpoint of preventing the deterioration of appearance on a printed surface, ions of benzoic acid, salicylic acid, or suberic acid are particularly preferable.

Content (molar equivalents) of the anions of an organic substance contained in the polyvalent metal salts is preferably 0.005 Eq or more, more preferably 0.01 Eq or more, even more preferably 0.02 Eq or more, still even more preferably 0.04 Eq or more, and most preferably 0.05 Eq or more in the whole amount of the receptive solution. Herein, the Eq (molar equivalents) is defined by the formula of n/(1×m), when the valency of anions of an organic substance is "1", the number of anions of an organic substance per molecule of a polyvalent metal salt is "m", and the valency of polyvalent metal ions is "n". For example, in case of trimagnesium dicitrate ($Mg_3(C_6H_5O_7)_2$), molar equivalents of the anions of an organic substance corresponding to 1.0 molar equivalent of the polyvalent metal salts is as follows: 2/(1×3)=0.67 Eq. By having 0.005 Eq or more, the image quality can be further enhanced when printing is made. Content of the anions of an organic substance is preferably 0.80 Eq or less, more preferably 0.60 Eq or less, and most preferably 0.40 Eq or less in the whole amount of the receptive solution. As the content of the anions of an organic substance is 0.80 Eq or less in the whole amount of the receptive solution, the dispersion property of the anions of an organic substance in the receptive solution is enhanced, and also the storage stability and ejection stability of the receptive solution are enhanced.

Furthermore, the anions originating from polyvalent metal salts or the like relating to the present embodiment may also contain anions other than the anions of an organic substance which have an OV/IV value of 0.3 or more and 1.0 or less. Examples of the anions other than the anions of an organic substance which have an OV/IV value of 0.3 or more and 1.0 or less include, although not particularly limited, anions of an organic substance such as an anion of pantothenic acid, an anion of pantoic acid, an anion of propionic acid, an anion of ascorbic acid, an anion of acetic acid, an anion of malic acid, an anion of benzoic acid, or an anion of lactic acid, and anions of an inorganic acid such as nitric acid ion, sulfuric acid ion, or chloride ion.

Furthermore, content of the anions of an organic substance which have an OV/IV value of 0.3 or more and 1.0 or less in the anions of an organic substance originating from the polyvalent metal salts or the like is, relative to the entire anions originating from the polyvalent metal salts or the like, preferably 50% by mass or more, more preferably 80% by mass or more, even more preferably 90% by mass or more, and still even more preferably 95% by mass or more.

(Polyvalent Metal Ions)

The polyvalent metal ions contained in the receptive solution of the present embodiment indicate ions of a metal which has valency of at least 2. By using the polyvalent metal ions, blurring of an ink composition can be suppressed. Examples of the polyvalent metal ions include calcium ion, magnesium ion, aluminum ion, titanium ion, iron (II) ion, iron (III) ion, cobalt ion, nickel ion, copper ion, zinc ion, barium ion, and strontium ion. Among them, from the viewpoint of having a high interaction with a color material in the ink composition and having higher effect of suppressing the blurring or unevenness, it is preferable to contain one or more types selected from calcium ion, magnesium ion, nickel ion, zinc ion, and aluminum ion.

Preferred content (molar concentration) of the polyvalent metal ions is preferably 0.01 mol/L or more, more preferably 0.02 mol/L or more, and even more preferably 0.05 mol/L or more in the entire amount of the receptive solution. As the content of the polyvalent metal ions is 0.01 mol/L or more in the entire amount of the receptive solution, the image quality can be further improved when printing is made. The polyvalent metal ions are preferably 0.40 mol/L or less, more preferably 0.30 mol/L or less, and even more preferably 0.20 mol/L or less in the entire amount of the receptive solution. As the content of the polyvalent metal ions is 0.40 mol/L or less in the entire amount of the receptive solution, the dispersion property of the polyvalent metal ions in the receptive solution is improved.

[Resin]

A resin is contained in the receptive solution of the present embodiment. Examples of the resin include a resin having hydrophilic group, and a cationic or non-ionic resin emulsion. From the viewpoint of having no blurring of an ink composition and enhancing the image quality when printing is made, it is preferable to have a cationic resin and/or a non-ionic resin, and more preferably a cationic resin. By using those resins, various resistances such as scratch resistance, water resistance, solvent resistance, and blocking resistance can be imparted to an obtained printed material, or gloss or print concentration of a printed material can be enhanced. Furthermore, at least part of the resin contained in the receptive solution of the present embodiment is contained as a resin emulsion. The resin emulsion in the present embodiment means an aqueous dispersion in which the continuous phase is a water-soluble solvent and the particles for dispersion are fine resin particles. By forming a resin emulsion, the resin can be dispersed, due to steric repulsive force or electrostatic repulsive force, as fine resin particles in the receptive solution.

For the resin emulsion, monomers as a raw material of a resin are subjected to a polymerization reaction, and, either before and/or after the polymerization, addition of an acid or base for the purpose of enhancing the dispersion property of a resin emulsion is carried out followed by neutralization. Due to this reason, there may be a case in which the anions originating from an acid, which is used for the process of producing a resin emulsion, are contained in the resin emulsion.

The acid for neutralization of the resin emulsion preferably contains an organic acid, and the organic acid in which the OV/IV value of anions of an organic substance in the organic acid is 0.3 or more and 1.0 or less is more preferable. Examples thereof include ions of benzoic acid (OV/IV value=0.85), salicylic acid (OV/IV value=0.53), 2,4-dihydroxybenzoic acid (OV/IV value=0.38), 2,5-dihydroxybenzoic acid (OV/IV value=0.38), glutaric acid (OV/IV value=0.33), suberic acid (OV/IV value=0.53), or trimellitic acid (OV/IV value=0.39).

Furthermore, from the viewpoint of storage stability and ejection stability of the receptive solution, among the anions of an organic substance in the organic acid, anions of an aromatic organic substance are preferable, anions of an organic substance having a benzene ring or anions of an organic substance having a polycyclic aromatic hydrocarbon (for example, compound having naphthalene ring, anthracene ring or the like) are more preferable, and anions of an organic substance having a benzene ring (for example, benzoic acid, salicylic acid, 2,4-dihydroxybenzoic acid, and 2,5-dihydroxybenzoic acid) are even more preferable. The aromatic organic substance indicates a cyclic unsaturated organic substance such as an organic substance having a benzene ring, an organic substance of a polycyclic aromatic hydrocarbon, and an organic substance of a heteroaromatic compound. Furthermore, the number of the atoms constituting one ring among the aromatic rings constituting the anions of an aromatic organic substance is preferably 5 or higher, and a benzene ring, a 5-membered heterocycle (pyrrole ring, furan ring, and thiophene ring), and a 6-membered heterocycle (pyridine ring, pyran ring, and thiopyran ring) are preferable. Furthermore, among the anions of an organic substance having a benzene ring, from the viewpoint of preventing the deterioration of appearance on a printed surface, ions of benzoic acid or salicylic acid are particularly preferable.

Furthermore, content of the anions of an organic substance which have an OV/IV value of 0.3 or more and 1.0 or less in the organic acid for neutralization of the resin emulsion is, relative to the entire anions originating from an acid for neutralization of the resin emulsion, preferably 50% by mass or more, more preferably 80% by mass or more, even more preferably 90% by mass or more, and still even more preferably 95% by mass or more.

Furthermore, it is not entirely necessary that the aforementioned anions of an organic substance originating from the polyvalent metal salts are the same as the anions of an organic substance originating from the organic acid that is used for the process of producing the resin emulsion. However, it is preferable that the anions of an organic substance originating from the polyvalent metal salts are the same as the anions of an organic substance originating from the resin emulsion.

The resin emulsion has a property of thickening aggregation when the water-soluble solvent, which is generally in continuous phase, is reduced by evaporation, permeation, or the like, and it also has an effect of promoting fixation of a color material on a recording medium. With the receptive solution of the present embodiment that is so-called aggregation type by which blurring of an ink composition is suppressed by aggregating the color material, a large amount of an ink composition can be fixed at high speed. On the other hand, there is also a receptive solution of so-called permeation type in which the receptive solution is applied on a recording medium followed by drying solidification to form a porous layer, an ink composition is ejected on the porous layer, and the ink composition is allowed to permeate into pores of the porous layer, but the receptive solution of the present embodiment that is an aggregation type has a different principle•working mechanism for fixing an ink composition.

As for the resin contained in the receptive solution of the present embodiment, an acrylic resin, a polystyrene resin, a polyester resin, a vinyl chloride resin, a vinyl acetate resin, a vinyl chloride-vinyl acetate copolymer resin, a polyethylene resin, a urethane resin, a silicone (silicon) resin, an acrylamide resin, an epoxy resin, or a copolymerization resin or a mixture thereof can be used. They are preferable from the viewpoint that they can enhance the solvent resistance in addition to the water resistance. Among them, from the viewpoint of having excellent ejection stability, water resistance, and solvent resistance, it is preferable to contain an acrylic resin.

The acrylic resin is not particularly limited as long as it contains a (meth)acrylic acid ester monomer as a main component of the constituting monomers. As for the (meth)acrylic acid ester monomer, known compounds can be used, and a monofunctional (meth)acrylic acid ester can be preferably used. Examples thereof include (meth)acrylic acid alkyl ester, (meth)acrylic acid aralkyl ester, and (meth)acrylic acid alkoxyalkyl ester. Specific examples thereof include (meth)acrylic acid esters such as methyl (meth) acrylate, ethyl (meth) acrylate, n-propyl (meth)acrylate, iso-propyl (meth)acrylate, n-butyl (meth)acrylate, sec-butyl (meth) acrylate, iso-butyl (meth) acrylate, tert-butyl (meth) acrylate, pentyl (meth)acrylate, neopentyl (meth) acrylate, hexyl (meth) acrylate, 2-ethylhexyl (meth) acrylate, octyl (meth) acrylate, iso-octyl (meth)acrylate, nonyl (meth)acrylate, iso-nonyl (meth)acrylate, dodecyl (meth)acrylate, tridecyl (meth) acrylate, stearyl (meth) acrylate, cyclopentyl (meth) acrylate, cyclohexyl (meth) acrylate, 2-methylcyclohexyl (meth) acrylate, dicyclopentanyl (meth) acrylate, dicyclopentenyl (meth) acrylate, dicyclopentanyloxyethyl (meth) acrylate, dicyclopentenyloxyethyl (meth) acrylate, dicyclohexyl (meth)acrylate, isobornyl (meth)acrylate, adamantyl (meth)acrylate, allyl (meth)acrylate, propargyl (meth) acrylate, phenyl (meth) acrylate, naphthyl (meth) acrylate, anthracenyl (meth) acrylate, anthraninonyl (meth) acrylate, piperonyl (meth)acrylate, salicyl (meth)acrylate, furyl (meth)acrylate, furfuryl (meth)acrylate, tetrahydrofuryl (meth) acrylate, tetrahydrofurfuryl (meth)acrylate, pyranyl (meth)acrylate, benzyl (meth)acrylate, phenethyl (meth) acrylate, cresyl (meth)acrylate, glycidyl (meth) acrylate, 3,4-epoxycyclohexylmethyl (meth)acrylate, 3,4-epoxycyclohexylethyl (meth) acrylate, 1,1,1-trifluoroethyl (meth) acrylate, perfluoroethyl (meth) acrylate, perfluoro-n-propyl (meth)acrylate, perfluoro-iso-propyl (meth) acrylate, heptadecafluorodecyl (meth) acrylate, triphenylmethyl (meth) acrylate, cumyl (meth) acrylate, 3-(N,N-dimethylamino) propyl (meth) acrylate, methoxyethyl (meth) acrylate, ethoxyethyl (meth) acrylate, butoxyethyl (meth) acrylate, 2-cyanoethyl (meth) acrylate, dimethylaminoethyl (meth) acrylate, diethylaminoethyl (meth) acrylate, trimethoxysilylpropyl (meth) acrylate, triethoxysilylpropyl (meth) acrylate, 3-methacryloxypropylmethyldiethoxysilane, and 3-methacryloxypropylmethyl dimethoxysilane. Furthermore, "(meth)acryl" means both "acryl" and "methacryl". Those monomers can be obtained from Mitsubishi Rayon Co., Ltd., NOF CORPORATION, Mitsubishi Chemical Corporation, Hitachi Chemical Company, Ltd., or the like.

The monomer constituting an acryl resin can be an acid group-containing monomer having an acid group, a hydroxyl group-containing monomer having a hydroxyl group, or an amino group-containing monomer having an amino group. Examples of the acid group-containing monomer having an acid group include a carboxyl group-containing monomer which has an ethylenically unsaturated double bond and a carboxyl group such as carboxyl group-containing aliphatic monomer such as acrylic acid, methacrylic acid, itaconic acid, fumaric acid, maleic acid, crotonic acid, citraconic acid, maleic anhydride, monomethyl maleate ester, monobutyl maleate ester, monomethyl itaconate ester, monobutyl itaconate ester, vinyl benzoate, monohydroxyethyloxalic acid (meth)acrylate, or caprolactone-modified (meth)acrylate having terminal carboxyl group. Examples of the hydroxyl group-containing monomer having a hydroxyl group include, although it is not particularly limited as long as it has an ethylenically unsaturated double bond and a hydroxyl group, 2-hydroxyethyl (meth)acrylate, 2-hydroxypropyl (meth) acrylate, 3-hydroxyethyl (meth) acrylate, 3-hydroxypropyl (meth) acrylate, 2-hydroxybutyl (meth) acrylate, 4-hydroxybutyl (meth) acrylate, caprolactone-modified hydroxy(meth)acrylate, methyl α-(hydroxymethyl)(meth)acrylate, ethyl α-(hydroxymethyl)(meth)acrylate, n-butyl α-(hydroxymethyl)(meth)acrylate, 1,4-cyclohexanedimethanol mono(meth)acrylate, and 4-hydroxybutyl (meth) acrylate. Examples of the amino group-containing monomer include, although it is not particularly limited as long as it has an ethylenically unsaturated double bond and an amino group, an acrylamide compound such as (meth)acrylamide N-monomethyl (meth) acrylamide, N-monoethyl (meth)acrylamide, N,N-dimethyl (meth) acrylamide, N-n-propyl (meth) acrylamide, N-iso-propyl (meth) acrylamide, methylenebis(meth)acrylamide, N-methylol (meth) acrylamide, N-butoxymethyl (meth) acrylamide, dimethylaminoethyl (meth) acrylamide, N,N-dimethylaminopropylacrylamide, or diacetone acrylamide, a nitrogen atom-containing (meth)acrylate compound such as dimethylaminoethyl (meth) acrylate, diethylaminoethyl (meth)acrylate, or (meth)acrylate of ethylene oxide adduct of morpholine, N-vinylpyrrolidone, N-vinylpyridine, N-vinylimidazole, N-vinylpyrrol, N-vinyloxazolidone, N-vinylsuccinimide, N-vinylmethylcarbamate, N,N-methylvinylacetamide, (meth) acryloyloxyethyltrimethyl ammonium chloride, 2-isopropenyl-2-oxazoline, and 2-vinyl-2-oxazoline, (meth) acrylonitrile.

Furthermore, the monomer constituting an acryl resin can have, other than the aforementioned (meth)acrylic acid ester monomer or the like, other monomers, if necessary. Those other monomers are not particularly limited as long as they can be copolymerized with the aforementioned (meth) acrylic acid ester monomer and enable obtainment of an acrylic resin with desired water resistance and solvent resistance, and it may be either a monofunctional monomer in which the number of the ethylenically unsaturated double bonds is 1, or a polyfunctional monomer in which the number of the ethylenically unsaturated double bonds is 2 or higher. Examples thereof which can be used include a vinyl monomer such as vinyl acetate, vinyl chloride, vinylidene chloride, vinyl fluoride, vinylidene fluoride, N-vinylpyrrolidone, vinylpyridine, N-vinylcarbazole, vinylimidazole, vinyl ether, vinyl ketone, or vinyl pyrrolidone; an aromatic vinyl monomer such as styrene, α-, o-, m-, p-alkyl, nitro, cyano, amide, or ester derivative of styrene, vinyl toluene, or chlorostyrene; an olefin monomer such as ethylene, propylene, or isopropylene; a diene monomer such as butadiene or chloroprene; and a vinyl cyanide compound such as acrylonitirile or methacrylonitrile. Furthermore, a diacrylate compound such as polyethylene glycol diacrylate, triethylene glycol diacrylate, or 1,3-butylene glycol diacrylate; a triacrylate compound such as trimethylolpropane triacrylate, trimethylolethane triacrylate, or tetramethylolmethane triacrylate; a dimethacrylate compound such as ethylene glycol dimethacrylate, diethylene glycol dimethacrylate, or triethylene glycol dimethacrylate; a trimethacrylate compound such as trimethylolpropane trimethacrylate or trimethylolethane trimethacrylate; a divinylbenzene compound or the like can be used. Furthermore, although the acrylic resin can be formed by using those monomers, the copolymerization form of monomers is not particularly limited, and it can be a block copolymer, a random copolymer, a graft copolymer, or the like, for example. The resin emulsion can be produced by, for example, an emulsion polymerization followed by neutralization. As for the emulsifier, a common polymer type surfactant may be used, or a reactive surfactant having an unsaturated bond may be used.

The average particle diameter of the resin emulsion is, from the viewpoint of the dispersion stability in the receptive solution and ink-jet ejection property, preferably 30 nm or more and more preferably 50 nm or more. The average particle diameter of the resin emulsion is, from the viewpoint of the dispersion stability in the receptive solution and ink-jet ejection property, preferably 300 nm or less and more preferably 250 nm or less. Furthermore, the number average particle diameter of a pigment can be measured by using a concentrated type particle size analyzer (FPAR-1000 manufactured by Otsuka Electronics Co., Ltd.) at a measurement temperature of 25° C.

The mass average molecular weight of the resin emulsion is, from the water resistance of a coating film, preferably 10000 or more, and more preferably 100000 or more. The mass average molecular weight of the resin emulsion is, from the stability of the receptive solution, preferably 1000000 or less and more preferably 500000 or less. Furthermore, the molecular weight of the resin indicates the mass average molecular weight Mw, which is a value measured by GPC (Gel Permeation Chromatography), and it can be measured by "HLC-8120GPC" that is manufactured by Tosoh Corporation, while polystyrene standards for curve calibration is used as a reference.

The glass transition temperature of the resin emulsion is, from the viewpoint that a printed material with water resistance, solvent resistance, and scratch resistance can be formed even for a case in which printing is made on a low absorbing substrate or a non-absorbing substrate, and also from the viewpoint that application of high temperature for forming a printed material can be avoided, a large amount of energy is not required to have, and the substrate for printing is not likely to receive a damage caused by heat, preferably 0° C. or higher, more preferably 10° C. or higher, and even more preferably 20° C. or higher. The glass transition temperature of the resin emulsion is preferably 100° C. or lower, more preferably 90° C. or lower, and even more preferably 80° C. or lower. Furthermore, the glass transition temperature (Tg) can be measured by a differential scanning calorimeter "DSC-50" manufactured by SHIMADZU CORPORATION, for example.

Part by mass of the resin (resin emulsion) in the receptive solution of the present embodiment, which is included in 100 parts by mass of the receptive solution, is, although not particularly limited, preferably 0.5 parts by mass or more, more preferably 1.0 part by mass or more, even more preferably 3.0 parts by mass or more, and still even more preferably 5.0 parts by mass or more in the receptive solution. Furthermore, it is preferably 20.0 parts by mass or less, more preferably 15.0 parts by mass or less, and even more preferably 12.0 parts by mass or less in the ink composition.

[Water-Soluble Solvent]

The solvent for the receptive solution of the present embodiment is a solvent which can disperse or dissolve a resin or the like. As for such solvent, a water-soluble solvent having solubility in water is used.

Herein, the water-soluble solvent indicates a solvent which can be dissolved, in 100 parts by mass of water at 25° C., at 5 parts by mass or more, preferably 20 parts by mass or more, more preferably 50 parts by mass or more, even more preferably 70 parts by mass or more, and particularly preferably 90 parts by mass or more under 1 atmospheric pressure. Specifically, the water-soluble solvent that can be used for the receptive solution of the present embodiment preferably contains water, a water-soluble organic solvent, or a mixed solvent thereof. It is preferable that water, a water-soluble organic solvent, or a mixed solvent thereof is preferably contained at 50% by mass or more in the whole solvent, and, in particular, preferably contained at 70% by mass or more, more preferably contained at 80% by mass or more, even more preferably contained at 90% by mass or more, and still even more preferably contained at 95% by mass or more. As water, a water-soluble organic solvent, or a mixed solvent thereof is contained in that range, more excellent dispersion stability of the resin can be obtained. Furthermore, water to be included in the water-soluble solvent does not contain various kinds of ions, and it is preferable to use deionized water such as ion exchange water, distilled water, or ultrapure water.

Examples of the water-soluble organic solvent include alkyl alcohols with carbon atom number of 1 to 5 such as methyl alcohol, ethyl alcohol, n-propyl alcohol, isopropyl alcohol, n-butyl alcohol, sec-butyl alcohol, tert-butyl alcohol, isobutyl alcohol, or n-pentanol; monovalent alcohols such as 3-methoxy-3-methyl-1-butanol, 3-methoxy-1-propanol, 1-methoxy-2-propanol, or 3-methoxy-n-butanol; amides such as 1-dimethylformamide, dimethylacetamide, 3-methoxypropaneamide, 3-butoxypropaneamide, N,N-dimethyl-3-methoxypropaneamide, N,N-dibutyl-3-methoxypropaneamide, N,N-dibutyl-3-butoxypropaneamide, or N,N-dimethyl-3-butoxypropaneamide; ketones or ketoalcohols such as acetone or diacetone alcohol; ethers such as tetrahydrofuran or dioxane; an oxyethylene or oxypropylene copolymer such as polyethylene glycol or polypropylene glycol; diols such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, or 2-methyl-2,4-pentanediol; triols such as glycerin, trimethylolethane, trimethylolpropane, or 1,2,6-hexanetriol; tetravalent alcohols such as mesoerythritol or pentaerythritol; monoalkyl ethers such as ethylene glycol monomethyl (or ethyl, isopropyl, n-butyl, isobutyl, n-hexyl, 2-ethylhexyl) ether, diethylene glycol monomethyl (or ethyl, isopropyl, n-butyl, isobutyl, n-hexyl, 2-ethylhexyl) ether, triethylene glycol monomethyl (or ethyl, isopropyl, n-butyl, isobutyl) ether, propylene glycol monomethyl (or ethyl, isopropyl, n-butyl, isobutyl) ether, or dipropylene glycol monomethyl (or ethyl, isopropyl, n-butyl, isobutyl) ether; dialkyl ethers of polyvalent alcohol such as diethylene glycol dimethyl ether, diethylene glycol diethyl ether, diethylene glycol ethyl methyl ether, triethylene glycol dimethyl ether, triethylene glycol diethyl ether, tetraethylene glycol dimethyl ether, tetraethylene glycol diethyl ether, propylene glycol dimethyl ether, propylene glycol diethyl ether, dipropylene glycol dimethyl ether, or dipropylene glycol diethyl ether; alkanolamines such as monoethanolamine, diethanolamine, triethanolamine, N-methylethanolamine, N-ethylethanolamine, N-butylethanolamine, N-methyldiethanolamine, N-ethyldiethanolamine, or N-butyldiethanolamine; nitrogen-containing heterocyclic compounds such as N-methyl-2-pyrrolidone, 2-pyrrolidone, or 1,3-dimethyl-2-imidazolidinone; and a cyclic compound such as γ-butyrolactone or sulfolane.

When a water-soluble organic solvent is contained in the water-soluble solvent, in particular, when the receptive solution is ink-jet ejected, it is preferable to contain those having higher boiling point than water, i.e., solvent having boiling point higher than 100° C., as water-soluble organic solvent. Among them, it is preferable to contain a solvent having boiling point of 150° C. or higher, and it is particularly preferable to contain a solvent having boiling point of 180° C. or higher. That is because, in case of ink-jet ejection of the receptive solution in particular, it is possible to suppress, in the receptive solution adhered to a nozzle or in a fine tube inside an ink-jet head, the increased viscosity of the receptive solution as caused by evaporation of the water-soluble organic solvent in an ink composition, and also prevent the breakage of an ink-jet head as caused by clogging of a nozzle or a tube. In addition, that is because the receptive solution having good fluidity and also good continuous ejection property or good ejection property after standing can be obtained, as a result. The water-soluble organic solvent having higher boiling point than water is contained preferably at 10% by mass or more, more preferably at 20% by mass or more, and even more preferably at 30% by mass or more in the whole water-soluble organic solvents.

Furthermore, when the boiling point of the water-soluble organic solvent is excessively high, a great amount of energy is required for drying and also a long period of time is required for drying, and thus it is difficult to cope with the high speed continuous printing. Due to this reason, the boiling point of the water-soluble organic solvent is preferably 300° C. or lower.

When printing is made on a low absorbing substrate and a non-absorbing substrate, it is preferable that content of a low volatile solvent is suppressed as the solvent is not likely to permeate the inside of a substrate, and it is preferable that the content of a water-soluble organic solvent having boiling point of 250° C. or higher is less than 5 parts by mass relative to 100 parts by mass of the receptive solution. Furthermore, it is more preferable that a water-soluble organic solvent having boiling point of 280° C. or higher is substantially not contained. Furthermore, the expression that a "water-soluble organic solvent having boiling point of 280° C. or higher is substantially not contained" means that the solvent is less than 1 part by mass relative to 100 parts by mass of the receptive solution.

Examples of the water-soluble organic solvent having boiling point of 280° C. or higher include triethylene glycol (boiling point: 285° C.), tetraethylene glycol (boiling point: 314° C.), glycerin (boiling point: 290° C.), 1,2,6-hexanetriol, trimethylolethane, trimethylolpropane, diglycerin, polyethylene glycol, and polypropylene glycol.

Examples of the water-soluble organic solvent having boiling point of 250° C. or higher but lower than 280° C. include tripropylene glycol (boiling point: 268° C.), tripropylene glycol monobutyl ether (boiling point: 274° C.), triethylene glycol monobutyl ether (boiling point: 271° C.), diethylene glycol mono-2-ethylhexyl ether (boiling point: 272° C.), 1,6-hexanediol (boiling point: 250° C.), and 3-methyl-1,5-pentanediol (boiling point: 250° C.)

Examples of the water-soluble organic solvent having boiling point of 200° C. or higher but lower than 250° C. include dipropylene glycol (boiling point: 232° C.), diethylene glycol (boiling point: 244° C.), tripropylene glycol monomethyl ether (boiling point: 242° C.), diethylene glycol monobutyl ether (boiling point: 231° C.), triethylene glycol monomethyl ether (boiling point: 249° C.), diethylene glycol monoisopropyl ether (boiling point: 207° C.), ethylene glycol mono-2-ethylhexyl ether (boiling point: 229° C.), ethylene glycol monohexyl ether (boiling point: 208° C.), dipropylene glycol monopropyl ether (boiling point: 212° C.), dipropylene glycol monobutyl ether (boiling point: 229° C.), dipropylene glycol monomethyl ether acetate (boiling point: 209° C.), diethylene glycol monobutyl ether acetate (boiling point: 247° C.), 1,3-propanediol (boiling point: 214° C.), 1,3-butanediol (boiling point: 208° C.), 1,4-butanediol (boiling point: 230° C.), 1,2-pentanediol (boiling point: 210° C.), 1,2-hexanediol (boiling point: 223° C.), 1,5-pentanediol (boiling point: 242° C.), 1,6-hexanediol (boiling point: 250° C.), 2,2,4-trimethyl-1,3-pentanediol (boiling point: 232° C.), 3-methyl-1,3-butanediol (boiling point: 203° C.), 2-methyl-1,3-pentanediol (boiling point: 214° C.), and 2-ethyl-1,3-hexanediol (boiling point: 244° C.)

Examples of the water-soluble organic solvent having boiling point of 180° C. or higher but lower than 200° C. include ethylene glycol (boiling point: 197° C.), propylene glycol (boiling point: 187° C.), 1,2-butanediol (boiling point: 193° C.), and 2-methyl-2,4-pentanediol (boiling point: 198° C.)

As for the water to be contained in the water-soluble water, it is preferable to use deionized water instead of water containing various kinds of ions. The content of water is not particularly limited, as long as each component can be dispersed or dissolved, but it is preferably within a range of 10% by mass or more in the water-soluble solvent, and, in particular, it is preferably within a range of 20% by mass or more, and particularly preferably within a range of 30% by mass or more. In the water-soluble solvent, it is preferably within a range of 95% by mass or less, and, in particular, it is more preferably within a range of 90% by mass or less.

Furthermore, the content of the water-soluble organic solvent is preferably within a range of 5% by mass or more in the water-soluble solvent, and, in particular, it is preferably within a range of 10% by mass or more. The content of the water-soluble organic solvent is preferably within a range of 90% by mass or less in the water-soluble solvent, and, in particular, it is preferably within a range of 80% by mass or less, and particularly preferably within a range of 70% by mass or less.

That is because, as the content of water and water-soluble organic solvent is within the aforementioned range, a favorable moisture-retaining property is yielded so that less nozzle clogging or the like can be obtained. In addition, easier ejection by an ink-jet head or the like can be obtained.

[Other Components]

The receptive solution may additionally contain conventionally known additives, if necessary. Examples of the additives include a viscosity modifier, a pH controlling agent, a surface tension controlling agent, an anti-oxidizing agent, a preservative, and an anti-fungal agent.

[Surface Tension of Receptive Solution]

The surface tension of the receptive solution is preferably 35.0 mN/m or less, more preferably 32.0 mN/m or less, and even more preferably 30.0 mN/m or less, from the viewpoint of wettability to the recording medium surface and miscibility with an ink composition. In the case of application on a non-absorbing substrate, in particular, it is preferably 26.0 mN/m or less. In the case of application of the receptive solution by an ink-jet method, it is preferable to set the surface tension of the receptive solution to 18.0 mN/m or more, and more preferably 19.5 mN/m or more from the viewpoint of having favorable ejection stability of the receptive solution from the ejection head. The surface tension of the receptive solution can be adjusted by appropriately selecting the above-mentioned water-soluble solvent and the above-mentioned surfactant. Furthermore, the surface tension in the present invention is a value measured by the Wilhelmy method (Model: CBVP-Z manufactured by Kyowa Interface Science Co., LTD.) at a measurement temperature of 25° C.

<Method for Producing Receptive Solution>

As a method for producing the receptive solution of the present embodiment, a method for producing a receptive solution including a step of preparing a resin emulsion in which a resin emulsion is prepared from a surfactant, a resin, and an acid containing an organic acid which has an OV/IV value of 0.3 or more and 1 or less, the OV/IV value being a ratio of an organic value to an inorganic value, and a step of producing a receptive solution in which a receptive solution containing a resin emulsion, anions of an organic substance which have an OV/IV value of 0.3 or more and 1 or less, the OV/IV value being a ratio of an organic value to an inorganic value, polyvalent metal cations, and a water-soluble solvent is produced can be mentioned.

The step of preparing a resin emulsion includes the following step, for example. A polymerizable compound is subjected to solution polymerization, and by using an acid containing an organic acid which has an OV/IV value of 0.3 or more and 1.0 or less, a polymerizable aqueous polymer is obtained. A step in which the polymerizable aqueous polymer and unreacted polymerizable compound are then subjected to emulsion polymerization to obtain a resin emulsion can be exemplified. The organic acid which has an OV/IV value of 0.3 or more and 1.0 or less is preferably 80% by mass or more, more preferably 90% by mass or more, and even more preferably 95% by mass or more relative to an acid for neutralizing the resin emulsion.

The step of producing a receptive solution is a step in which a receptive solution is produced by using the resin emulsion. As a method for producing a receptive solution by using the resin emulsion, a method in which the production is made by adding the emulsion resin, polyvalent metal cations, and polyvalent metal salts containing anions containing the anions of an organic substance which have an OV/IV value of 0.3 or more and 1.0 or less (for example, magnesium caprylate) to a water-soluble solvent or a method in which the production is made by adding the emulsion resin, a compound capable of generating anions containing the anions of an organic substance having an OV/IV value of 0.3 or more and 1.0 or less (for example, caprylic acid), and a compound capable of generating polyvalent metal cations (for example, magnesium hydroxide) to a water-soluble solvent can be mentioned.

<Ink Set for Ink-Jet Recording>

For the ink-jet recording method of the present embodiment, an ink set for ink-jet recording in which the receptive solution of the aforementioned embodiment and an ink composition for ink-jet recording are combined can be used.

<Ink Composition>

As an ink composition of the present embodiment, an ink composition containing a color material, a resin, and a solvent, in which the solvent contains at least a water-soluble solvent, is used, and, within the effects of the present invention are not impaired, other components may be also contained, if necessary.

[Color Material]

The color material of the present embodiment is not particularly limited, and it may be either a dye-based or a pigment-based. It is preferable to use a pigment-based ink composition that can provide a printed material with favorable resistance such as water resistance and light resistance. In the present embodiment, the pigment which may be used for an ink composition is not particularly limited. An organic pigment or an inorganic pigment conventionally used for an ink composition can be mentioned. They may be used either singly or in combination of two or more types thereof. Specific examples of the organic pigment include an insoluble azo pigment, a soluble azo pigment, derivatives from dyes, a phthalocyanine-based organic pigment, a quinacridone-based organic pigment, a perylene-based organic pigment, a dioxazine-based organic pigment, a nickel azo-based pigment, an isoindolinone-based organic pigment, a pyranthrone-based organic pigment, a thioindigo-based organic pigment, a condensed azo-based organic pigment, a benzimidazolone-based organic pigment, a quinophthalone-based organic pigment, an isoindoline-based organic pigment, an organic solid pigment such as a quinacridone-based solid pigment and a perylene-based solid pigment, and, as other pigment, a carbon black or the like.

Content of the pigment which can be used in an ink composition in the present embodiment is not particularly limited as long as a desire image can be formed, and it is appropriately adjusted. Specifically, although it may vary depending on a type of a pigment, the content is preferably within a range of 0.05% by mass or more, and more preferably within a range of 0.1% by mass or more relative to the whole ink composition. The content is preferably within a range of 20% by mass or less, and more preferably within a range of 10% by mass or less relative to the whole ink composition. As the content of the pigment is within a range of 20% by mass or less, excellent balance between the dispersion stability and coloring power of a pigment can be obtained.

The pigment which can be used in the present embodiment may be a pigment dispersion obtained by dispersing a pigment in a water-soluble solvent with a pigment-dispersing resin, or a pigment dispersion which is a self-dispersing pigment obtained by modifying a hydrophilic group directly on a surface of the pigment. Herein, the pigment-dispersing resin means a water-soluble resin which adheres to a part of a surface of a pigment and thereby improves dispersion property of the pigment in an ink composition. The water-soluble resin means a resin which is dissolved in an amount of 1 part by mass or more in 100 parts by mass of water at 25° C. under 1 atm. By making the pigment-dispersing resin which is a water-soluble resin get adhered to a part of a surface of a pigment, dispersion property of the pigment in an ink composition is improved, and thus a high-gloss image can be obtained. In the present invention, the pigment that can be used for an ink composition may be a combination of a plurality of organic pigments and inorganic pigments, or a combination of a pigment dispersion dispersed in a water-soluble solvent by a pigment-dispersing resin and a self-dispersing pigment.

The pigment-dispersing agent for the pigment which can be used in an ink composition of the present embodiment is not particularly limited. For example, a surfactant such as a cationic-based, an anionic-based, a non-ionic based, an amphiphilic, a silicone (silicon)-based, and a fluorine-based can be used. Among the surfactants, the polymer surfactant (polymer dispersing agent) as exemplified in the followings is preferable.

[Resin]

In the present embodiment, the resin used for an ink composition is to promote fixing of a pigment on a surface of a recording medium. From the viewpoint of having excellent fixing property and excellent water resistance of a printed material, the resin is preferably a resin emulsion, and it may be the same as the receptive solution.

[Water-Soluble Solvent]

In the present embodiment, as the water-soluble solvent used in an ink composition, water and a water-soluble organic solvent can be mentioned. The water-soluble organic solvent may be the same as the water-soluble organic solvent which has been exemplified for the receptive solution of the embodiment described in the above. Water and water-soluble organic solvent may be used either singly, or as a mixture thereof.

[Other Components]

The ink composition of the present embodiment may additionally contain conventionally known additives, if necessary. Examples of the additives include a surfactant, a wax emulsion, a viscosity modifier, a pH controlling agent, a surface tension controlling agent, an anti-oxidizing agent, a preservative, and an anti-fungal agent.

[Method for Producing Ink Composition]

The method for producing an ink composition which can be used for the ink set of the present embodiment is not particularly limited. For example, a method in which the production is made by adding a self-dispersing pigment, a resin, a surfactant, and, if necessary, other components, to a water-soluble solvent, a method in which the production is made by adding and dispersing a pigment and a dispersing agent in a water-soluble solvent followed by adding a resin, a surfactant, and, if necessary, other components, and a method in which the production is made by adding a pigment, a resin, a surfactant, and, if necessary, other components to a water-soluble solvent followed by dispersing the pigment can be mentioned.

<Method for Applying Receptive Solution>

The ejection method using the receptive solution or ink set of the above embodiment (hereinbelow, the method may be also simply described as an "ejection method") is not particularly limited. Examples of the ejection method include a spray method, a coater method, an ink-jet method, a gravure method, and a flexographic method. Among them, the ejection is preferably made by an ink-jet method. According to the ink-jet method, the application can be easily made either on an arbitrary site or on an entire surface of a printed material.

Furthermore, according to the receptive solution of the above embodiment, a compound that is not soluble in a solvent of the receptive solution does not precipitate from the anions of an organic substance included in the receptive solution. Due to this reason, the ink-jet ejection is not impeded by the precipitation of a compound that is not soluble in a solvent of the receptive solution. As such, the receptive solution of the embodiment is preferably ejected by an ink-jet method.

Furthermore, when the receptive solution of the above embodiment is applied on a recording medium and then the above ink composition is ejected on a surface of a recording medium on top of the receptive solution, the ink composition is preferably ejected while the receptive solution on top of the recording medium is present as a liquid on a surface of the recording medium. As the ejection is made while the receptive solution is present as a liquid, repulsion of the ejected ink composition, which is caused by drying solidification of the resin emulsion, can be suppressed. Furthermore, when the receptive solution is present as a liquid on a surface of a substrate, the fixing property of an ink composition can be enhanced without having a resin layer resulting from drying solidification of the resin emulsion is dissolved again by a solvent contained in the ink composition. Furthermore, the expression "receptive solution is present as a liquid on a surface of the recording medium" means a state in which the receptive solution is present on a surface of the recording medium while it maintains fluidity without being dried•solidified.

As the ejection method is an ink-jet method, it is possible to have high-speed ejection of the receptive solution and ink composition at any arbitrary site on a recording medium. Due to this reason, in order to have ejection of the above ink composition while the receptive solution is present as a liquid on a surface of the recording medium, the ejection method is most preferably an ink-jet method.

[Recording Medium]

For the ink-jet recording method, the recording medium is not particularly limited, and all of an absorbing substrate, a low absorbing substrate, and a non-absorbing substrate can be suitably used. Examples of the absorbing substrate include uncoated paper such as woody paper, medium-quality paper, high-quality paper, or copy paper (PCC); and a fabric such as cotton, a chemical fiber fabric, silk, hemp, or a nonwoven fabric. Furthermore, the absorption property of a recording medium can be tested by JAPAN TAPPI Paper Pulp Test Method No. 51-87 or the like, for example. The uncoated paper has a high absorption property because it is not applied with a coating agent for lowering penetration and absorption of an ink composition.

Herein, the term "low absorbing substrate" or "non-absorbing substrate" described in the present specification indicates a recording medium which has water absorption amount of 10 mL/m$^2$ or less from the start of contact to 30 msec according to Bristow method. The Bristow method is most widely used as a method of measuring a liquid absorption amount within a short time, and it is also employed by Japan Technical Association of the Pulp and Paper Industry (JAPAN TAPPI). Details of the test method are described in "Paper and Cardboard—Method for testing liquid absorption—Bristow method" of Standard 51 of "Method for testing paper and pulp by JAPAN TAPPI, edition of year 2000."

Examples of the low absorbing substrate include coated paper such as slightly coated paper, lightweight coated paper, coated paper, art paper, or cast paper. The coated paper is obtained by applying a coating agent prepared by adding a white pigment or a binder component to improve surface smoothness, and absorption or penetration of an ink composition into the coated paper does not easily occur. Examples of the non-absorbing substrate include a plastic film such as a polyester resin, a polypropylene resin, a vinyl chloride resin, a polyimide resin, or the like; metal, metallized paper, glass, synthetic rubber, natural rubber, and leather, but it is not limited thereto. The ink-jet recording method which may be used for the ink set of the present embodiment can be used suitably even when a low absorbing substrate having a low ink composition penetration property or a non-absorbing substrate is used. The ink-jet recording method makes it possible to obtain a clear image having no color unevenness and having suppressed color bleeding.

[Printing Device]

When an ink-jet recording device allowing recording by an ink-jet method as an ejection method is used, the receptive solution and ink set of the present embodiment can be applied to an ink-jet recording device such as a piezo type, a thermal type, and an electrostatic type. Among those devices, the ink composition is preferably used for the piezo type ink-jet recording device. In a recording head of the piezoelectric type, a piezoelectric vibrator is used as a pressure generating element, and the pressure in a pressure chamber is increased or decreased by deformation of the piezoelectric vibrator to eject ink droplets. As an attempt of having further improved high image quality or enhancement of recording speed, for the recording head, an attempt of having further improved high image quality by increasing the number of recordable colors by increasing the number of nozzle arrays is made, and also an attempt of having enhancement of recording speed by increasing the number of nozzle openings constituting one nozzle array is made. In addition, to increase the number of nozzles formed in one head, an attempt of refining the nozzle is also made.

However, when the nozzles of the head are refined, flight bending and nozzle clogging easily occur by clinging and remaining ink composition. In addition, when aggregates occur in the component of the ink composition in use for a long period of time, they will become an obstacle to the flying of ink droplets, and troubles such as flight bending and nozzle clogging will occur. For this reason, the development of an ink composition for which stable ejection is possible without clogging occurring in the ink-jet head has been becoming a matter of considerable urgency. Therefore, the ink composition of the ink set of the present embodiment that can suppress an occurrence of aggregates and has excellent stability is suitable for a piezo-type ink-jet recording device, and it can be used for any one of a serial head type recording device and a line head type recording device.

According to the ink-jet recording method relating to the present embodiment, blurring or white spots is suppressed so that a clear image can be obtained, and also deterioration of a device can be suppressed and excellent ejection stability can be obtained.

According to the ink-jet recording method, feathering and strike-through, which become problems particularly when an absorbing substrate is used as a recording medium, can be suppressed, and also white spots and color bleeding, which become problems particularly when a low absorbing substrate or a non-absorbing substrate is used as a recording medium, can be suppressed, and thus the blurring and white spots can be suppressed regardless of a recording medium.

When an absorbing substrate such as non-coated paper is used as a recording medium, there are problems that, as the ink composition can easily penetrate the recording medium, a strike-through in which the pigment does not stay on a surface of the recording medium and the ink composition reaches even the inner side of a substrate, a color material concentration on a surface of a recording medium is low, or a clear image is not obtained as smearing easily occurs along the paper fiber and feathering easily occurs. When a low absorbing substrate or a non-absorbing substrate is used as a recording medium, it is difficult for the ink composition to penetrate, and the ink composition is rather rejected on a surface on a recording medium. As such, dots are not sufficiently spread and a printing surface is insufficiently filled with an ink composition, and thus there are problems that it is easy to have an occurrence of uneven printing or white spots. Furthermore, when a non-absorbing substrate is used as a recording medium, there are problems that the time required for drying is long, and, as the rejected ink droplets are irregularly connected to each other, it is easy to have an occurrence of blurring or unevenness.

As a result of intensive studies by the inventors of the present invention, it was found that, after applying the receptive solution of the present embodiment on a printing surface, if an ink-jet ink composition is ejected before the receptive solution becomes dried, uneven printing or white spots in a low absorbing substrate or a non-absorbing substrate can be suppressed. The time point at which the receptive solution is applied on a recording medium is not particularly limited as long as the contact between an ink composition and the receptive solution is made on a recording medium, but, for effective suppression of the feathering or bleeding, the receptive solution is preferably applied immediately before ejecting an ink composition. It is believed that, by ejecting an ink composition before the receptive solution becomes dried, the ink composition remains wet so that it can easily spread on a surface of a recording medium and the dot diameter of an ink composition becomes large so that uneven printing or white spots disappear, and, at the same time, due to instant mixing between the receptive solution and an ink composition, the pigment dispersion state rapidly changes and the ink composition is fixed without having an occurrence of color bleeding.

Furthermore, in the present embodiment, it is preferable that the ink composition is ejected and applied on a recording medium in a state in which the surface of a recording medium is heated to 30° C. or higher. In the present embodiment, it is preferable that the ink composition is ejected and applied on a recording medium in a state in which the surface of a recording medium is heated to 60° C.

or lower. As the surface temperature of a region of a recording medium to be applied by the ink composition is set at 30° C. or higher at the time of ejecting the ink composition, the ink composition remains wet to have favorable spreading even for a low absorbing substrate or a non-absorbing substrate, and thus it becomes possible to produce a clear printed material. Furthermore, as the surface temperature of a region of a recording medium to be applied by the ink composition is set at 60° C. or lower at the time of ejecting the ink composition, deformation of a recording medium caused by heat can be suppressed, a favorable image can be printed, and, as the clinging of the ink composition on a nozzle surface of an ink-jet head caused by heat is suppressed, it becomes possible to maintain the ejection stability.

<Method for Producing Printed Material>

A printed material can be also produced by using the aforementioned ink-jet recording method. For example, a method for producing a printed material including a step of applying the receptive solution of the above embodiment on a recording medium or on an ink composition containing a color material can be mentioned. By including a step of applying the receptive solution of the above embodiment, blurring or white spots in a printed material is suppressed so that a clear image can be obtained. Furthermore, the expression "applying the receptive solution of the above embodiment on a recording medium or on an ink composition containing a color material" is a concept which includes both the application of the receptive solution of the above embodiment on a recording medium and the application of the receptive solution of the above embodiment after ejecting an ink composition containing a color material on the recording medium. It is particularly preferable that the receptive solution is applied on a surface of a recording medium, and then the ink composition is applied on a surface of the recording medium. From the viewpoint that the receptive solution or ink composition can be easily ejected on an arbitrary site and also on an entire surface of a printed material when the ejection is made by an ink-jet method, it is preferable that the receptive solution of the present embodiment and an ink composition are ejected by an ink-jet method and the receptive solution of the above embodiment and an ink composition are ejected on a surface of the recording medium.

EXAMPLES

Hereinbelow, the present invention is more specifically described by Examples. However, the present invention is not limited to the following Examples.

<Preparation of Receptive Solution>

By using polyvalent metal salts, a resin (resin emulsion), a water-soluble solvent (water-soluble organic solvent, water (ion exchange water)), and a surfactant, receptive solutions of Examples and Comparative Examples were prepared as described in the following table. Number for each component means parts by mass. Furthermore, the expression "remaining" in the table means that, by adding water after incorporating each component other than water, the incorporation is made such that the receptive solution becomes 100 parts by mass as a whole.

In the table, "TEGO Twin 4000" indicates a leveling agent manufactured by Evonik Degussa GmbH.

In the table, "Emulsogen TS290" indicates tristyrenylated phenyl ether manufactured by Clariant GmbH.

In the table, "Newcol 2616" indicates polyoxyalkylene polycyclic phenyl ether manufactured by NIPPON NYU-KAZAI CO., LTD.

In the table, "benzoic acid-neutralized emulsion" indicates a cationic acryl emulsion which has been prepared as follows. To a flask, 65 parts by mass of ion exchange water flushed with nitrogen were added, and, subsequently, 3.5 parts by mass of a non-reactive surfactant [manufactured by Kao Corporation; product name "Emulgen 1135S-70"] were added and dissolved therein. Next, the resulting surfactant solution was maintained at 75° C. and added with dimethylaminoethyl methacrylate as a cationic monomer, and then, 1.20 parts by mass of benzoic acid were added and sufficiently mixed to neutralize the cationic monomer. After that, 0.7 parts by mass of 14% aqueous solution of 2,2'-azobis (2-amidinopropane) was added thereto. Subsequently, continuous dropwise addition of 98 parts by mass of a mixture solution of methyl methacrylate and 2-ethyl-hexyl-acrylate (mass ratio of 69.5/27.8) was initiated such that the glass transition temperature becomes 50° C. to 60° C. Inside of the flask was maintained at 78° C.±2° C. using a water bath, and the dropwise addition of the monomer mixture solution was completed after 4 hours. After the completion of the dropwise addition of the monomer mixture solution, 0.7 parts by mass of 14% aqueous solution of 2,2'-azobis(2-aminopropane) was added, and, after allowing it to stand for 2 hours, the resultant was cooled to obtain a cationic acryl emulsion.

The "salicylic acid-neutralized emulsion" in the table means a salicylic acid-neutralized emulsion which has been produced, according to neutralization by salicylic acid, in the same manner as the above "benzoic acid-neutralized emulsion" except that "1.35 parts by mass of salicylic acid" is used instead of "1.20 parts by mass of benzoic acid".

The "acetic acid-neutralized emulsion" in the table means an acetic acid-neutralized emulsion which has been produced, according to neutralization by acetic acid, in the same manner as the above "benzoic acid-neutralized emulsion" except that "0.59 parts by mass of acetic acid" is used instead of "1.20 parts by mass of benzoic acid".

The "nitric acid-neutralized emulsion" in the table means a nitric acid-neutralized emulsion which has been produced, according to neutralization by nitric acid, in the same manner as the above "benzoic acid-neutralized emulsion" except that "9.8 parts by mass of 1 mol/L nitric acid" are used instead of "1.20 parts by mass of benzoic acid".

The "hydrochloric acid-neutralized emulsion" in the table means a hydrochloric acid-neutralized emulsion which has been produced, according to neutralization by hydrochloric acid, in the same manner as the above "benzoic acid-neutralized emulsion" except that "9.8 parts by mass of 1 mol/L hydrochloric" are used instead of "1.20 parts by mass of benzoic acid".

[Evaluation]

Storage Stability of Receptive Solution (Viscosity Change)

Viscosity (initial viscosity, Va) of the receptive solutions of Examples and Comparative Examples before the storage test to be described later was measured. Specifically, by using a falling-ball viscometer based on DIN EN ISO 12058-1, the initial viscosity (Va) was measured at 25° C. Then, the receptive solutions of Examples and Comparative Examples were subjected to the storage test, and the viscosity after storage test (Vb) was measured. Specifically, a sample obtained by adding about 25 ml of the receptive solutions of Examples and Comparative Examples to a transparent glass bottle with capacity of 30 ml followed by tight sealing was subjected to a storage test with temperature of 60° C. and storage period of 7 days. Then, the viscosity was measured, in the same manner as the test for measuring the initial viscosity (Va), for the receptive solutions of Examples and Comparative Examples after the storage test. The results are shown in Tables 1 and 2.
(Evaluation Criteria)
⊚: |Vb−Va|/Va×100 is less than 5%.
◯: |Vb−Va|/Va×100 is 5% or more but less than 10%.
Δ: |Vb−Va|/Va×100 is 10% or more but less than 30%.
X: |Vb−Va|/Va×100 is 30% or more, or the receptive solution of the storage test was gelified.
Furthermore, |Vb−Va| means an absolute value of a difference between Va and Vb.
<Odor Test>
Odor test was carried out for the receptive solutions of Examples and Comparative Examples. Specifically, the receptive solution was printed by an ink-jet method on a recording medium (polyvinyl chloride film (IMAGin JT5829R manufactured by MACtac, LLC)), and five testees were asked to smell the recording medium which has been applied with the receptive solution and then sensory evaluation was carried out based on the following criteria. The results are shown in the table (in the table, described as "odor").
(Evaluation Criteria)
⊚: More than half of the people found that there is no odor.
◯: More than half of the people found that there is slight odor.
X: More than half of the people found that there is unpleasant odor.
<Color Exhibition Test>
Color exhibition test was carried out for the receptive solutions of Examples and Comparative Examples. By using a bar coater #8, the receptive solution was applied on an entire surface of a recording medium (polyvinyl chloride film (IMAGin JT5829R manufactured by MACtac, LLC)), and then, after ejecting the following ink compositions A to C thereto, an image of high definition color digital standard image data (ISO/JIS-SCID) and each solid color were printed and evaluated. The results are shown in the table (in the table, described as "color exhibition").
(Evaluation Criteria)
⊚: Color exhibition is favorable.
◯: Color exhibition is slightly poor, but not problematic in terms of practical use.
X: Color exhibition is poor.
  Ink Composition A (Mg)

| Pigment dispersion PD-1 (red) | 20 parts by mass |
| Resin emulsion RE-1 | 20 parts by mass |
| Propylene glycol | 40 parts by mass |
| Nopcote PEM-17 | 1 part by mass |
| TegoTwin 4200 | 1 part by mass |
| Ion exchange water | 18 parts by mass |

The pigment dispersion PD-1 (red) was obtained by dissolving 2.5 g of a pigment-dispersing agent obtained from the above and 0.6 g of N,N-dimethylaminoethanol in 80 g of ion exchange water, adding 15 g of C.I. Pigment Red 122 with 0.05 g of an anti-foaming agent ("Surfynol 104PG" manufactured by Air Products and Chemicals, Inc.), and dispersing them with a paint shaker using zirconia beads.
  Ink Composition B (Bk)

| Pigment dispersion PD-5 (black) | 20 parts by mass |
| Resin emulsion RE-2 | 20 parts by mass |
| 1,3-Propanediol | 10 parts by mass |
| Propylene glycol | 35 parts by mass |
| AQUACER 515 | 1 part by mass |
| Silface SAG503A | 1 part by mass |
| Dynol 604 | 0.5 parts by mass |
| Ion exchange water | 12.5 parts by mass |

The pigment dispersion PD-5 (black) was obtained by dissolving 15 g of carbon black, 2 g (in solid matter) of a pigment-dispersing agent SOLSPERSE 47000 (solid dispersion value: 20 mgKOH/g, polymer dispersing agent), and 0.05 g of an anti-foaming agent ("Surfynol 104PG" manufactured by Air Products and Chemicals, Inc.) in 80 g of ion exchange water, and dispersing them with a paint shaker using zirconia beads.
  Ink Composition C (Bk)

| CAB-O-JET 400 | 30 parts by mass |
| Resin emulsion RE-1 | 20 parts by mass |
| Propylene glycol | 30 parts by mass |
| PEM-17 | 1 part by mass |
| Silface SAG503A | 1 part by mass |
| Ion exchange water | 18 parts by mass |

For the above resin emulsion RE-1, the inside of a flask provided with a mechanical stirrer, a thermometer, a nitrogen introducing tube, a reflux tube, and a dropping funnel was sufficiently flushed with nitrogen gas, and then 0.75 g of a reactive surfactant (product name: LATEMUL PD-104 manufactured by Kao Corporation), 0.04 g of potassium persulfate, 0.3 g of methacrylic acid and 150 g of pure water were injected thereto followed by stirring at 25° C. for mixing. Subsequently, a mixture with 112 g of methyl methacrylate, 22.5 g of 2-ethylhexyl acrylate, and 15 g of butyl acrylate was added by dropwise addition thereto to prepare a pre-emulsion. Furthermore, the inside of a flask provided with a mechanical stirrer, a thermometer, a nitrogen introducing tube, a reflux tube, and a dropping funnel was sufficiently flushed with nitrogen gas, and then 3 g of a reactive surfactant (product name: LATEMUL PD-104 manufactured by Kao Corporation), 0.01 g of potassium persulfate, and 200 g of pure water were mixed with each other at 70° C. under stirring. After that, the prepared pre-emulsion was added to the flask by dropwise addition over 3 hours. The product was further heated and matured at 70° C. for 3 hours and then cooled down, the pH was adjusted to be 8 by N,N-dimethyl ethanolamine, and the product was obtained by filtration through #150 mesh (manufactured by Nippon Orimono Co., Ltd.).
<Gloss Determination Test>
Gloss determination test was carried out for the receptive solutions of Examples and Comparative Examples. Specifically, the receptive solutions of Examples and Comparative Examples and the above ink compositions A to C were applied on a polyvinyl chloride film (IMAGin JT5829R manufactured by MACtac, LLC), which is a non-absorbing substrate without receptive layer, while the surface temperature of a substrate was set at 40° C. when the receptive solution and the above ink compositions A to C are adhered on a substrate surface, and then, after ejecting the receptive solution and ink composition thereto, an image of high definition color digital standard image data (ISO/JIS-SCID) and each solid color were printed followed by drying by setting the surface temperature of a printed material at 80° C. The results are shown in the table (in the table, described as "gloss").
(Evaluation Criteria)
⊚: Gloss is shown and color exhibition is favorable.
◯: Gloss is slightly poor, but not problematic in terms of practical use.
X: Gloss is low and color exhibition is poor.

TABLE 1

|  | Example1 | Example2 | Example3 | Example4 | Example5 | Example6 | Example7 | Example8 | Example9 | Example10 |
|---|---|---|---|---|---|---|---|---|---|---|
| TEGO Twin4000 | 1.0 | 1.0 | 1.0 | 1.0 | 1.0 | 1.0 | 1.0 | 1.0 | 1.0 | 1.0 |
| Emulgen A-90 |  |  |  |  |  |  |  |  |  |  |
| Emulgen B-66 | 1.0 |  |  | 1.0 | 1.0 |  |  | 1.0 | 1.0 | 1.0 |
| Emulsogen TS100 |  |  |  |  |  |  |  |  |  |  |
| Emulsogen TS160 |  |  |  |  |  |  | 1.0 |  |  |  |
| Emulsogen TS290 |  |  | 1.0 |  |  | 1.0 |  |  |  |  |
| Newcol 2616 |  | 1.0 |  |  |  |  |  |  |  |  |
| Unithox 480 |  |  |  |  |  |  |  |  |  |  |
| Propylene glycol | 20.0 |  | 25.0 | 10.0 | 40.0 | 25.0 | 25.0 | 20.0 |  |  |
| 1,2-Butanediol |  | 25.0 |  | 10.0 |  | 10.0 | 5.0 | 15.0 | 25.0 | 20.0 |
| 1,2-Pentanediol | 10.0 |  | 10.0 | 25.0 |  |  | 10.0 |  | 10.0 | 10.0 |
| 1,2-Hexanediol |  | 5.0 |  |  |  |  |  |  |  |  |
| Water | Remaining | Remaining | Remaining | Remaining | Remaining | Remaining | Remaining | Remaining | Remaining | Remaining |
| Benzoic acid-neutralized | 5.0 | 5.0 | 5.0 | 5.0 | 5.0 | 5.0 | 5.0 |  |  |  |
| Salicylic acid-neutralized |  |  |  |  |  |  |  | 5.0 | 5.0 | 5.0 |
| Acetic acid-neutralized |  |  |  |  |  |  |  |  |  |  |
| Nitric acid-neutralized |  |  |  |  |  |  |  |  |  |  |
| Hydrochloric acid-neutralized |  |  |  |  |  |  |  |  |  |  |
| Magnesium benzoate |  | 2.7 | 2.7 | 2.7 | 2.7 |  |  |  |  | 2.7 |
| Calcium benzoate | 2.7 |  |  |  |  |  |  |  |  |  |
| Magnesium acetate |  |  |  |  |  |  |  |  |  |  |
| Calcium acetate |  |  |  |  |  |  |  |  |  |  |
| Magnesium nitrate |  |  |  |  |  |  |  |  |  |  |
| Calcium nitrate |  |  |  |  |  |  |  |  |  |  |
| Calcium hydrochloride |  |  |  |  |  |  |  |  |  |  |
| Magnesium salicylate |  |  |  |  |  | 3.0 |  | 3.0 |  |  |
| Calcium hydrochloride |  |  |  |  |  |  |  | 2.8 | 2.8 |  |
| Magnesium pyrrolidone carboxylic acid |  |  |  |  |  |  |  |  |  |  |
| Calcium pantothenate |  |  |  |  |  |  |  |  |  |  |
| Benzoic acid |  |  |  |  |  |  |  |  |  |  |
| Magnesium hydroxide |  |  |  |  |  |  |  |  |  |  |
| Caprylic acid |  |  |  |  |  |  |  |  |  |  |
| Pyrrolidone carboxylic acid |  |  |  |  |  |  |  |  |  |  |
| OV/IV of neutralizing acid | 0.85 | 0.85 | 0.85 | 0.85 | 0.85 | 0.85 | 0.85 | 0.53 | 0.53 | 0.53 |
| OV/IV of acid of metal salts | 0.85 | 0.85 | 0.85 | 0.85 | 0.85 | 0.53 | 0.53 | 0.53 | 0.53 | 0.85 |
| Concentration of polyvalent metal ions (mol/l) | 0.1 | 0.1 | 0.1 | 0.1 | 0.1 | 0.1 | 0.1 | 0.1 | 0.1 | 0.1 |
| Storage stability | ◎ | ◎ | ◎ | ◎ | ◎ | ◎ | ◎ | ◎ | ◎ | ◎ |
| Odor | ◎ | ◎ | ◎ | ◎ | ◎ | ◎ | ◎ | ◎ | ◎ | ◎ |
| Color exhibition | ◎ | ◎ | ◎ | ◎ | ○ | ○ | ○ | ◎ | ◎ | ○ |
| Gloss | ◎ | ◎ | ◎ | ◎ | ○ | ◎ | ◎ | ◎ | ◎ | ◎ |

|  | Example11 | Example12 | Example13 | Example14 | Example15 | Example16 | Example17 | Example18 | Example19 |
|---|---|---|---|---|---|---|---|---|---|
| TEGO Twin4000 | 1.0 | 1.0 | 1.0 | 1.0 | 1.0 | 1.0 | 1.0 | 1.0 | 1.0 |
| Emulgen A-90 |  |  |  | 1.0 |  |  |  |  |  |
| Emulgen B-66 | 1.0 | 1.0 | 1.0 |  | 1.0 |  | 1.0 | 1.0 | 1.0 |
| Emulsogen TS100 |  |  |  |  |  | 1.0 |  |  |  |
| Emulsogen TS160 |  |  |  |  |  |  |  |  |  |
| Emulsogen TS290 |  |  |  |  |  |  |  |  |  |
| Newcol 2616 |  |  |  |  |  |  |  |  |  |
| Unithox 480 |  |  |  |  |  |  |  |  |  |
| Propylene glycol |  | 10.0 | 15.0 | 10.0 | 20.0 |  | 10.0 | 20.0 | 30.0 |
| 1,2-Butanediol | 20.0 | 10.0 | 25.0 |  |  | 30.0 | 20.0 |  | 10.0 |
| 1,2-Pentanediol | 10.0 | 15.0 |  |  | 15.0 |  | 5.0 | 15.0 |  |
| 1,2-Hexanediol | 5.0 |  |  | 30.0 | 5.0 |  |  | 5.0 |  |
| Water | Remaining | Remaining | Remaining | Remaining | Remaining | Remaining | Remaining | Remaining | Remaining |
| Benzoic acid-neutralized |  | 5.0 | 5.0 | 5.0 | 5.0 | 5.0 | 5.0 | 5.0 | 5.0 |

TABLE 1-continued

| | | | | | | | | | |
|---|---|---|---|---|---|---|---|---|---|
| Salicylic acid-neutralized | 5.0 | | | | | | | | |
| Acetic acid-neutralized | | | | | | | | | |
| Nitric acid-neutralized | | | | | | | | | |
| Hydrochloric acid-neutralized | | | | | | | | | |
| Magnesium benzoate | | 1.3 | 5.4 | 2.7 | 8.1 | 0.3 | 2.4 | 2.7 | |
| Calcium benzoate | 2.7 | | | | | | | | |
| Magnesium acetate | | | | | 0.3 | | | | |
| Calcium acetate | | | | | | | | | |
| Magnesium nitrate | | | | | | | | 0.15 | |
| Calcium nitrate | | | | | | | | | |
| Calcium hydrochloride | | | | | | | | | |
| Magnesium salicylate | | | | | | | | | |
| Calcium hydrochloride | | | | | | | | | |
| Magnesium pyrrolidone carboxylic acid | | | | | | | | | |
| Calcium pantothenate | | | | | | | | | |
| Benzoic acid | | 2.4 | | | | | | | |
| Magnesium hydroxide | | 0.6 | | | | | | | |
| Caprylic acid | | | | | | | | | |
| Pyrrolidone carboxylic acid | | | | | | | | | 0.1 |
| OV/IV of neutralizing acid | 0.53 | 0.85 | 0.85 | 0.85 | 0.85 | 0.85 | 0.85 | 0.85 | 0.85 |
| OV/IV of acid of metal salts | 0.85 | 0.85 | 0.85 | 0.85 | 0.85, 027 | 0.85 | 0.85 | 0.85, 0 | 0.85, 0.28 |
| Concentration of polyvalent metal ions (mol/l) | 0.1 | 0.1 | 0.05 | 0.2 | 0.1 | 0.4 | 0.01 | 0.1 | 0.1 |
| Storage stability | ◎ | ◎ | ◎ | ○ | ◎ | Δ | ◎ | ◎ | ◎ |
| Odor | ◎ | ◎ | ◎ | ◎ | ◎ | ◎ | ◎ | ◎ | ◎ |
| Color exhibition | ○ | ◎ | ◎ | ○ | ○ | Δ | Δ | ○ | ○ |
| Gloss | ◎ | ◎ | ◎ | ○ | ○ | Δ | ◎ | ○ | ○ |

TABLE 2

| | Comparative Example1 | Comparative Example2 | Comparative Example3 | Comparative Example4 | Comparative Example5 | Comparative Example6 | Comparative Example7 |
|---|---|---|---|---|---|---|---|
| Twin4000 | 1.0 | 1.0 | 1.0 | 1.0 | 1.0 | 1.0 | 1.0 |
| Emulgen A-90 | | | | | | | |
| Emulgen B-66 | | 1.0 | | 1.0 | | | 1.0 |
| Emulsogen TS100 | | | | | 1.0 | 1.0 | |
| Emulsogen TS160 | | 1.0 | | | | | |
| Emulsogen TS290 | | | 1.0 | | | | |
| Newcol 2616 | | | | | | | |
| Unithox 480 | | | | | | | |
| Propylene glycol | 10.0 | | 10.0 | | 10.0 | 25.0 | 10.0 |
| 1,2-Butanediol | | 20.0 | | 20.0 | 10.0 | | 30.0 |
| 1,2-Pentanediol | | | 10.0 | 25.0 | 10.0 | 15.0 | 10.0 |
| 1,2-Hexanediol | 20.0 | 5.0 | | 5.0 | | | |
| Water | Remaining | Remaining | Remaining | Remaining | Remaining | Remaining | Remaining |
| Benzoic acid-neutralized Em | | | | | | | 5.0 |
| Salicylic acid-neutralized Em | | | | | | | |
| Acetic acid-neutralized Em | 5.0 | | | | 5.0 | | |
| Nitric acid-neutralized Em | | 5.0 | 5.0 | | | 5.0 | |
| Hydrochloric acid-neutralized | | | | 5.0 | | | |
| Magnesium benzoate | | | | | | | |
| Calcium benzoate | | | | | | | |
| Magnesium acetate | 1.4 | | | | 1.4 | 1.4 | |
| Calcium acetate | | | | | | | |

TABLE 2-continued

|  |  |  |  |  |  |  |  |
|---|---|---|---|---|---|---|---|
| Magnesium nitrate | 1.5 |  |  |  | 1.5 |  |  |
| Calcium nitrate |  | 1.6 |  |  |  |  |  |
| Calcium hydrochloride |  |  | 1.1 |  |  |  |  |
| Magnesium salicylate |  |  |  |  |  |  |  |
| Calcium hydrochloride |  |  |  |  |  |  |  |
| Magnesium pyrrolidone |  |  |  |  |  |  |  |
| Calcium pantothenate |  |  |  |  |  |  |  |
| Benzoic acid |  |  |  |  |  |  |  |
| Magnesium hydroxide |  |  |  |  |  |  |  |
| Caprylic acid |  |  |  |  |  |  |  |
| Pyrrolidone carboxylic acid |  |  |  |  |  |  |  |
| OV/IV of neutralizing acid | 0.27 | 0 | 0 | 0 | 0.27 | 0 | 0.85 |
| OV/IV of acid of metal salts | 0.27 | 0 | 0 | 0 | 0 | 0.27 | 0.27 |
| Concentration of polyvalent metal ions (mol/l) | 0.1 | 0.1 | 0.1 | 0.1 | 0.1 | 0.1 | 0.1 |
| Storage stability | ☺ | ☺ | ☺ | ☺ | ☺ | ☺ | ☺ |
| Odor | X | ☺ | ☺ | ☺ | X | X | X |
| Color exhibition | X | X | X | X | X | X | X |
| Gloss | X | X | X | X | X | X | X |

|  | Comparative Example8 | Comparative Example9 | Comparative Example10 | Comparative Example11 | Comparative Example12 | Comparative Example13 | Comparative Example14 |
|---|---|---|---|---|---|---|---|
| Twin4000 | 1.0 | 1.0 | 1.0 | 1.0 | 1.0 | 1.0 | 1.0 |
| Emulgen A-90 |  |  |  |  |  |  | 1.0 |
| Emulgen B-66 |  |  | 1.0 |  | 1.0 | 1.0 |  |
| Emulsogen TS100 |  |  |  |  |  |  |  |
| Emulsogen TS160 |  |  |  | 1.0 |  |  |  |
| Emulsogen TS290 |  |  |  |  |  |  |  |
| Newcol 2616 |  | 1.0 |  |  |  |  |  |
| Unithox 480 | 1.0 |  |  |  |  |  |  |
| Propylene glycol | 15.0 |  | 10.0 | 10.0 |  | 25.0 | 20.0 |
| 1,2-Butanediol | 25.0 | 25.0 |  | 20.0 | 25.0 | 10.0 |  |
| 1,2-Pentanediol |  | 10.0 |  | 5.0 |  |  | 15.0 |
| 1,2-Hexanediol |  |  | 30.0 |  |  |  | 5.0 |
| Water | Remaining | Remaining | Remaining | Remaining | Remaining | Remaining | Remaining |
| Benzoic acid-neutralized Em | 5.0 | 5.0 | 5.0 |  |  |  |  |
| Salicylic acid-neutralized Em |  |  |  | 5.0 | 5.0 | 5.0 | 5.0 |
| Acetic acid-neutralized Em |  |  |  |  |  |  |  |
| Nitric acid-neutralized Em |  |  |  |  |  |  |  |
| Hydrochloric acid-neutralized |  |  |  |  |  |  |  |
| Magnesium benzoate |  |  |  |  |  |  |  |
| Calcium benzoate |  |  |  |  |  |  |  |
| Magnesium acetate |  |  |  | 1.4 |  |  |  |
| Calcium acetate |  |  |  |  |  |  |  |
| Magnesium nitrate | 1.5 |  |  |  | 1.5 |  |  |
| Calcium nitrate |  |  |  |  |  |  |  |
| Calcium hydrochloride |  |  |  |  |  |  |  |
| Magnesium salicylate |  |  |  |  |  |  |  |
| Calcium hydrochloride |  |  |  |  |  |  |  |
| Magnesium pyrrolidone |  | 2.8 |  |  |  | 2.8 |  |
| Calcium pantothenate |  |  | 4.8 |  |  |  | 4.8 |
| Benzoic acid |  |  |  |  |  |  |  |
| Magnesium hydroxide |  |  |  |  |  |  |  |
| Caprylic acid |  |  |  |  |  |  |  |
| Pyrrolidone carboxylic acid |  |  |  |  |  |  |  |

TABLE 2-continued

|  | | | | | | | |
|---|---|---|---|---|---|---|---|
| OV/IV of neutralizing acid | 0.85 | 0.85 | 0.85 | 0.53 | 0.53 | 0.53 | 0.53 |
| OV/IV of acid of metal salts | 0 | 0.28 | 0.29 | 0.27 | 0 | 0.28 | 0.29 |
| Concentration of polyvalent metal ions (mol/l) | 0.1 | 0.1 | 0.1 | 0.1 | 0.1 | 0.1 | 0.1 |
| Storage stability | ⊚ | ⊚ | ⊚ | ⊚ | ⊚ | ⊚ | ⊚ |
| Odor | ⊚ | ⊚ | ⊚ | X | ⊚ | ⊚ | ⊚ |
| Color exhibition | X | X | X | X | X | X | X |
| Gloss | X | X | X | X | X | X | X |

|  | Comparative Example15 | Comparative Example16 | Comparative Example17 | Comparative Example18 | Comparative Example19 | Comparative Example20 |
|---|---|---|---|---|---|---|
| Twin4000 | 1.0 | 1.0 | 1.0 | 1.0 | 1.0 | 1.0 |
| Emulgen A-90 | | | | | | |
| Emulgen B-66 | 1.0 | | 1.0 | 1.0 | 1.0 | |
| Emulsogen TS100 | | 1.0 | | | | 1.0 |
| Emulsogen TS160 | | | | | | |
| Emulsogen TS290 | | | | | | |
| Newcol 2616 | | | | | | |
| Unithox 480 | | | | | | |
| Propylene glycol | 20.0 | | 30 | 10 | 20.0 | |
| 1,2-Butanediol | | 30 | | | 15.0 | 25 |
| 1,2-Pentanediol | 10.0 | | | 15 | | 5 |
| 1,2-Hexanediol | | | 5 | 5 | | |
| Water | Remaining | Remaining | Remaining | Remaining | Remaining | Remaining |
| Benzoic acid-neutralized Em | | | | 5.0 | 5.0 | |
| Salicylic acid-neutralized Em | | | | | | 5.0 |
| Acetic acid-neutralized Em | 5.0 | | | | | |
| Nitric acid-neutralized Em | | 5.0 | | | | |
| Hydrochloric acid-neutralized | | | 5.0 | | | |
| Magnesium benzoate | 2.7 | 2.7 | 2.7 | | | |
| Calcium benzoate | | | | | | |
| Magnesium acetate | | | | | | |
| Calcium acetate | | | | | | |
| Magnesium nitrate | | | | | | |
| Calcium nitrate | | | | | | |
| Calcium hydrochloride | | | | | | |
| Magnesium salicylate | | | | | | |
| Calcium hydrochloride | | | | | | |
| Magnesium pyrrolidone | | | | | | |
| Calcium pantothenate | | | | | | |
| Benzoic acid | | | | | | |
| Magnesium hydroxide | | | | 0.6 | | |
| Caprylic acid | | | | 2.9 | | |
| Pyrrolidone carboxylic acid | | | | | | |
| OV/IV of neutralizing acid | 0.27 | 0 | 0 | 0.85 | 0.85 | 0.27 |
| OV/IV of acid of metal salts | 0.85 | 0.85 | 0.85 | 1.1 | 0 | 0 |
| Concentration of polyvalent metal ions (mol/l) | 0.1 | 0.1 | 0.1 | 0.1 | 0 | 0 |
| Storage stability | ⊚ | ⊚ | ⊚ | ⊚ | ⊚ | ⊚ |
| Odor | X | ⊚ | ⊚ | ○ | ⊚ | ⊚ |
| Color exhibition | X | X | X | X | X | X |
| Gloss | X | X | X | X | X | X |

According to the receptive solution of Examples, the OV/IV value of anions of an organic substance contained in the receptive solution is 0.3 or more and 1.0 or less. More specifically, according to the receptive solution of Examples 1 to 11, 13, 14, 16, and 17, the OV/IV value of anions of an organic substance originating from polyvalent metal salts is 0.3 or more and 1.0 or less and the OV/IV value of anions of an organic substance originating from an acid, which is used during the process of producing a resin emulsion, is 0.3 or more and 1.0 or less. The receptive solution of Examples, in which the OV/IV value of anions of an organic substance is 0.3 or more and 1.0 or less, is a receptive solution which shows a favorable result from any of the "storage stability", "odor", "color exhibition", and "gloss" test. As such, it was confirmed that, when applied on a recording medium, the receptive solution of the present invention is a receptive solution which can suppress the occurrence of odor from the receptive solution itself when the receptive solution is applied on a recording medium, and also can prevent the appearance of a printed surface from being deteriorated.

Furthermore, according to the receptive solution of Example 12, the OV/IV value of anions of an organic substance (ions of benzoic acid) originating from a compound capable of generating anions of an organic substance (benzoic acid) is 0.3 or more and 1.0 or less and the OV/IV value of anions of an organic substance originating from an acid (benzoic acid), which is used during the process of producing a resin emulsion, is 0.3 or more and 1.0 or less. It was confirmed that, even if the anions of an organic substance are not those anions of an organic substance originating from polyvalent metal salts as the receptive solution of Example 12, it is a receptive solution that can suppress the occurrence of odor similarly to other Examples, and also the receptive solution that can prevent the appearance of a printed surface from being deteriorated.

It was also confirmed that, even when the content of polyvalent metal salts contained in the receptive solutions of Examples 13, 14, 16, and 17 is 0.3% by mass to 8.1% by mass, those receptive solutions are a receptive solution that can suppress the occurrence of odor and also a receptive solution that can prevent the appearance of a printed surface from being deteriorated, similar to above. In particular, it was confirmed that the receptive solutions of Examples 13 and 14, in which the content of polyvalent metal salts is 1.3% by mass to 5.4% by mass, are a receptive solution which shows a particularly favorable result from any of the "storage stability", "odor", "color exhibition", and "gloss" test when compared to the receptive solutions of Examples 16 and 17.

According to the receptive solutions of Examples 15, 18, and 19, the OV/IV value of anions of an organic substance contained in the receptive solution is 0.3 or more and 1.0 or less, but nitric acid ions ($NO_3^-$) which have an OV/IV value of 0 or acetic acid ions ($CH_3COO^-$) which have an OV/IV value of 0.27 are contained therein. Accordingly, it was confirmed that, as long as it is a receptive solution in which the anions of an organic substance having an OV/IV value of 0.3 or more and 1.0 or less are contained, it is a receptive solution that can prevent the appearance of a printed surface from being deteriorated even when anions of an inorganic substance or an organic substance having a different OV/IV value are contained in the receptive solution.

It was also confirmed that any receptive solution in which the anions of an organic substance contained in the receptive solution are benzoic acid ions (Examples 1 to 5, and 10 to 19) or salicylic acid ions (Examples 6 to 9) is a receptive solution which shows a favorable result from any of the "storage stability", "odor", "color exhibition", and "gloss" test. The anions of any organic substance, i.e., "benzoic acid ions" and "salicylic acid ions", are anions of an aromatic organic substance. From the viewpoint that the receptive solutions containing anions of an aromatic organic substance have similar crystallinity, it is believed that, without being limited to the "benzoic acid ions" and "salicylic acid ions", the same results as Examples of the present application are obtained from all receptive solutions containing anions of an aromatic organic substance.

Meanwhile, the receptive solutions of Comparative Examples 1 to 17 containing anions of an organic substance having an OV/IV value of less than 0.3 are a receptive solution which shows a deteriorated result at least from the "color exhibition", and "gloss" test.

The receptive solutions of Comparative Examples 7 to 14 in which the OV/IV value of anions of an organic substance originating from a resin emulsion is 0.3 or more and 1.0 or less and anions of an organic substance, in which the OV/IV value of anions of an organic substance originating from polyvalent metal salts is less than 0.3, are contained, the receptive solutions of Comparative Examples 15 to 17 in which the OV/IV value of anions of an organic substance originating from a resin emulsion is less than 0.3 and anions of an organic substance, in which the OV/IV value of anions of an organic substance originating from polyvalent metal salts is 0.3 or more and 1.0 or less, are contained, and the receptive solution of Comparative Example 18 in which the OV/IV value of anions of an organic substance originating from a resin emulsion is 0.3 or more and 1.0 or less and anions of an organic substance, in which the OV/IV value of anions of an organic substance originating from polyvalent metal salts is more than 1.0, are contained were found to be a receptive solution which shows a deteriorated result from the "color exhibition", and "gloss" test, similar to the receptive solutions of Comparative Examples 1 to 6 in which both the OV/IV value of anions of an organic substance originating from a resin emulsion and OV/IV value of anions of an organic substance originating from polyvalent metal salts are less than 0.3. The receptive solutions of Comparative Examples 19 and 20, in which polyvalent metal cations and anions of an organic substance originating from polyvalent metal salts or the like are not originally contained, were also found to be a receptive solution which shows a deteriorated result from the "color exhibition" and "gloss" test, similar to the receptive solutions of Comparative Examples 1 to 6.

From the test results, it was confirmed that a receptive solution exhibiting the effect of the present invention cannot be obtained if only one of (1) OV/IV value of anions of an organic substance originating from a resin emulsion and (2) OV/IV value of anions of polyvalent metal salts or an organic substance originating from a compound capable of generating anions of an organic substance is set at 0.3 or more and 1.0 or less, but, by setting the OV/IV value of "anions of an organic substance" originating from any component, including the above (1) and (2), at 0.3 or more and 1.0 or less, the effect of the present invention can be exhibited.

The invention claimed is:

1. A receptive solution for ink-jet recording ink, comprising polyvalent metal cations, a water-soluble solvent, a resin, and anions, wherein
the resin is contained as a resin emulsion, and
the anions contained in the receptive solution contain anions of an organic substance which have an OV/IV value of 0.3 or more and 1.0 or less, the OV/IV value being a ratio of an organic value to an inorganic value.

2. The receptive solution according to claim 1, wherein the anions of an organic substance are anions of an aromatic organic substance.

3. The receptive solution according to claim 1, wherein the resin emulsion contains the anions of an organic substance.

4. The receptive solution according to claim 1, wherein the resin emulsion is a cationic resin emulsion.

5. The receptive solution according to claim 1, wherein the receptive solution is ejected by an ink-jet method.

6. The receptive solution according to claim 1, wherein an anion of benzoic acid and/or an anion of salicylic acid are/is contained in the anions that are contained in the receptive solution.

7. An ink set comprising:
the receptive solution according to claim 1; and
an ink composition containing a color material.

8. A method for producing a receptive solution, comprising:
 a step for producing a resin emulsion in which a resin emulsion is produced at least from a surfactant, a resin, and an acid; and
 a step for producing a receptive solution in which a receptive solution containing the resin emulsion, anions, cations of polyvalent metals, and a water-soluble solvent is produced, wherein
 the acid of the step for producing a resin emulsion contains an organic acid which has an OV/IV value of 0.3 or more and 1.0 or less, the OV/IV value being a ratio of an organic value to an inorganic value, and
 the anions of the step for producing a receptive solution contain anions of an organic substance which have an OV/IV value of 0.3 or more and 1.0 or less, the OV/IV value being a ratio of an organic value to an inorganic value.

9. The method for producing a receptive solution according to claim 8, wherein the acid of the step for producing a resin emulsion contains benzoic acid and/or salicylic acid.

10. The method for producing a receptive solution according to claim 8, wherein the anions of the step for producing a receptive solution contain an anion of benzoic acid and/or an anion of salicylic acid.

11. A method for producing a printed material, comprising a step of applying the receptive solution according to claim 1 on a recording medium, or on an ink composition containing a color material.

12. The receptive solution according to claim 2, wherein the resin emulsion contains the anions of an organic substance.

13. The receptive solution according to claim 2, wherein the resin emulsion is a cationic resin emulsion.

14. The receptive solution according to claim 3, wherein the resin emulsion is a cationic resin emulsion.

15. The receptive solution according to claim 2, wherein the receptive solution is ejected by an ink-jet method.

16. The receptive solution according to claim 3, wherein the receptive solution is ejected by an ink-jet method.

17. The receptive solution according to claim 2, wherein an anion of benzoic acid and/or an anion of salicylic acid are/is contained in the anions that are contained in the receptive solution.

18. An ink set comprising:
the receptive solution according to claim 2; and
an ink composition containing a color material.

19. The method for producing a receptive solution according to claim 9, wherein the anions of the step for producing a receptive solution contain an anion of benzoic acid and/or an anion of salicylic acid.

20. A method for producing a printed material, comprising a step of applying the receptive solution according to claim 2 on a recording medium, or on an ink composition containing a color material.

* * * * *